United States Patent
Guerrero et al.

(10) Patent No.: US 11,875,446 B2
(45) Date of Patent: Jan. 16, 2024

(54) PROCEDURAL MEDIA GENERATION

(71) Applicant: ADOBE INC., San Jose, CA (US)

(72) Inventors: Paul Augusto Guerrero, London (GB); Milos Hasan, Lafayette, CA (US); Kalyan K. Sunkavalli, San Jose, CA (US); Radomir Mech, Mountain View, CA (US); Tamy Boubekeur, Paris (FR); Niloy Jyoti Mitra, Potters Bar (GB)

(73) Assignee: ADOBE, INC., San Jose, CA (US)

( * ) Notice: Subject to any disclaimer, the term of this patent is extended or adjusted under 35 U.S.C. 154(b) by 91 days.

(21) Appl. No.: 17/662,287

(22) Filed: May 6, 2022

(65) Prior Publication Data
US 2023/0360310 A1   Nov. 9, 2023

(51) Int. Cl.
G06T 15/04   (2011.01)
G06T 17/00   (2006.01)
G06V 10/776  (2022.01)
G06V 10/426  (2022.01)
G06V 10/774  (2022.01)
G06V 10/44   (2022.01)

(52) U.S. Cl.
CPC .............. *G06T 15/04* (2013.01); *G06T 17/00* (2013.01); *G06V 10/426* (2022.01); *G06V 10/44* (2022.01); *G06V 10/776* (2022.01); *G06V 10/7747* (2022.01)

(58) Field of Classification Search
CPC ..... G06T 15/04; G06T 17/00; G06V 10/7747; G06V 10/44; G06V 10/426; G06V 10/776
See application file for complete search history.

(56) References Cited

U.S. PATENT DOCUMENTS

| 9,251,225 | B2* | 2/2016 | Stanfill | G06F 16/25 |
| 2016/0275209 | A1* | 9/2016 | Kelly | G06F 30/00 |
| 2020/0302250 | A1* | 9/2020 | Chu | G06F 30/13 |

OTHER PUBLICATIONS

Abdal, et al., "Image2StyleGAN: How to Embed Images Into the StyleGAN Latent Space?", arXiv preprint arXiv:1904.03189v2 [cs.CV] Sep. 3, 2019, 23 pages.

(Continued)

*Primary Examiner* — Xin Sheng
(74) *Attorney, Agent, or Firm* — F. CHAU & ASSOCIATES, LLC

(57) ABSTRACT

Aspects of a system and method for procedural media generation include generating a sequence of operator types using a node generation network; generating a sequence of operator parameters for each operator type of the sequence of operator types using a parameter generation network; generating a sequence of directed edges based on the sequence of operator types using an edge generation network; combining the sequence of operator types, the sequence of operator parameters, and the sequence of directed edges to obtain a procedural media generator, wherein each node of the procedural media generator comprises an operator that includes an operator type from the sequence of operator types, a corresponding sequence of operator parameters, and an input connection or an output connection from the sequence of directed edges that connects the node to another node of the procedural media generator; and generating a media asset using the procedural media generator.

20 Claims, 15 Drawing Sheets

(56) References Cited

OTHER PUBLICATIONS

Abdal, et al., "StyleFlow: Attribute-conditioned Exploration of StyleGAN-Generated Images using Conditional Continuous Normalizing Flows", arXiv preprint arXiv:2008.02401v2 [cs.CV] Sep. 20, 2020, 22 pages.
Adobe, 2019, Substance, available at https://www.substance3d.com.
Adobe, 2021a, Substance 3D Community Assets, available at https://substance3d.adobe.com/community-assets.
Adobe, 2021b, Substance 3D Assets, available at https://substance3d.adobe.com/assets.
Ba, et al., "Layer Normalization", arXiv preprint arXiv:1607.06450v1 [stat.ML] Jul. 21, 2016, 14 pages.
Cho, et al., "On the Properties of Neural Machine Translation: Encoder-Decoder Approaches", arXiv preprint arXiv:1409.1259v2 [cs.CL] Oct. 7, 2014, 9 pages.
Du, et al., "InverseCSG: Automatic Conversion of 3D Models to CSG Trees", ACM Transactions on Graphics, vol. 37, No. 6, Dec. 2018, Article No. 213, pp. 1-16, Dec. 2018, 16 pages.
Ellis, et al., "DreamCoder: Growing generalizable, interpretable knowledge with wake-sleep Bayesian program learning", arXiv preprint arXiv:2006.08381v1 [cs.AI] Jun. 15, 2020, 22 pages.
Galerne, et al., "Gabor Noise by Example", ACM Transactions on Graphics, vol. 31, No. 4, Jul. 2012, Article No. 73, pp. 1-9, 10 pages.
Gatys, et al., "A Neural Algorithm of Artistic Style", arXiv preprint arXiv:1508.06576v2 [cs.CV] Sep. 2, 2015, 16 pages.
Gatys, et al., "Texture synthesis and the controlled generation of natural stimuli using convolutional neural hetworks", arXiv preprint arXiv:1505.07376v1 [cs.CV] May 27, 2015, 9 pages.
Goodfellow, et al., "Generative Adversarial Nets", arXiv preprint arXiv:1406.2661v1 [stat.ML] Jun. 10, 2014, 9 pages.
Guo, et al., "A Bayesian Inference Framework for Procedural Material Parameter Estimation", arXiv preprint arXiv:1912.01067v5 [cs.GR] Nov. 4, 2020, 12 pages.
Guo, et al., "MaterialGAN: Reflectance Capture using a Generative SVBRDF Model", arXiv preprint arXiv:2010.00114v1 [cs.CV] Sep. 30, 2020, 13 pages.
Härkönen, et al., "GANSpace: Discovering Interpretable GAN Controls", arXiv preprint arXiv:2004.02546v3 [cs.CV] Dec. 14, 2020, 29 pages.
Henzler, et al., "Learning a Neural 3D Texture Space from 2D Exemplars", arXiv preprint arXiv:1912.04158v2 [cs. CV] Apr. 2, 2020, 14 pages.
Heusel, et al., "GANS Trained by a Two Time-Scale Update Rule Converge to a Local Nash Equilibrium", arXiv preprint arXiv:1706.08500v6 [cs.LG] Jan. 12, 2018, 38 pages.
Hochreiter, et al., 1997. "Long Short-Term Memory", Neural Computation vol. 9, No. 8, Dec. 1997, pp. 1735-1780, 33 pages.
Houthooft, et al., "Curiosity-driven Exploration in Deep Reinforcement Learning via Bayesian Neural Networks", arXiv preprint arXiv:1605.09674v1 [cs.LG] May 31, 2016, 11 pages.
Hu, et al., "A Novel Framework for Inverse Procedural Texture Modeling", ACM Transactions on Graphics, vol. 38, No. 6, Nov. 2019, pp. 186:1-186:14, 14 pages.
Jones, et al., "ShapeAssembly: Learning to Generate Programs for 3D Shape Structure Synthesis", arXiv preprint arXiv:2009.08026v1 [cs.GR] Sep. 17, 2020, 20 pages.
Karras, et al., "A Style-Based Generator Architecture for Generative Adversarial Networks", arXiv preprint arXiv:1812.04948v3 [cs. NE] Mar. 29, 2019, 12 pages.
Karras, et al., "Analyzing and Improving the Image Quality of StyleGAN", arXiv preprint arXiv:1912.04958v2 [cs.CV] Mar. 23, 2020, 21 pages.
Kubat, "Neural Networks: A Comprehensive Foundation by Simon Haykin, Macmillan, 1994, ISBN 0-02-352781-7", The Knowledge Engineering Review, vol. 13, No. 4, 1998, pp. 409-412, 4 pages.
Kumar, et al., "VideoFlow: A Flow-Based Generative Model for Video", arXiv preprint arXiv:1903.01434v1 [cs.CV] Mar. 4, 2019, 13 pages.
Lefebvre, et al., "Analysis and Synthesis of Structural Textures", In Proceedings of the Graphics Interface 2000 Conference, May 2000, Montréal, Quebec, Canada, pp. 77-86, 10 pages.
Li, et al., "GRASS: Generative Recursive Autoencoders for Shape Structures", arXiv preprint arXiv:1705.02090v2 [cs.GR] May 13, 2017, 13 pages.
Mo, et al., "StructureNet: Hierarchical Graph Networks for 3D Shape Generation", arXiv preprint arXiv:1908.00575v1 [cs.GR] Aug. 1, 2019, 29 pages.
Nash, et al., "PolyGen: An Autoregressive Generative Model of 3D Meshes", arXiv preprint arXiv:2002.10880v1 [cs.GR] Feb. 23, 2020, 16 pages.
Van den Oord, et al., "Pixel Recurrent Neural Networks", arXiv preprint arXiv:1601.06759v3 [cs.CV] Aug. 19, 2016, 11 pages.
Para, et al., "SketchGen: Generating Constrained CAD Sketches", arXiv preprint arXiv:2106.02711v1 [cs.LG] Jun. 4, 2021, 21 pages.
Perlin, "An Image Synthesizer", SIGGRAPH Computer Graphics, vol. 19, No. 3, Jul. 1985, pp. 287-296, 10 pages.
Radford, et al., "Language Models are Unsupervised Multitask Learners", OpenAI, 2019, 24 pages.
Ribeiro, et al., "Sketchformer: Transformer-based Representation for Sketched Structure", arXiv preprint arXiv:2002.10381v1 [cs. CV] Feb. 24, 2020, 9 pages.
Richardson, et al., "Encoding in Style: a StyleGAN Encoder for Image-to-Image Translation", arXiv preprint arXiv:2008.00951v2 [cs.CV] Apr. 21, 2021, 21 pages.
Rubner, et al., "A Metric for Distributions with Applications to Image Databases", Proceedings of the 1998 IEEE International Conference on Computer Vision, Bombay, India, 1998, 8 pages.
Scarselli, et al., "The graph neural network model", IEEE Transactions on Neural Networks, vol. 20, No. 1, 2009, pp. 61-80, 22 pages.
Shi, et al., "MATch: Differentiable Material Graphs for Procedural Material Capture", ACM Transactions on Graphics, vol. 39, No. 6, Nov. 2020, Article 196, pp. 1-15, 15 pages.
Simonyan, et al., 2015, "Very Deep Convolutional Networks for Large-Scale Image Recognition", arXiv preprint arXiv:1409.1556v6 [cs.CV]) Apr. 10, 2015, 14 pages.
Szegedy, et al., "Going Deeper with Convolutions", arXiv preprint arXiv:1409.4842v1 [cs.CV] Sep. 17, 2014, 12 pages.
Vaswani, et al., "Attention Is All You Need", arXiv preprint arXiv:1706.03762v5 [cs.CL] Dec. 6, 2017, 15 pages.
Vinyals, et al., "Pointer Networks", arXiv preprint arXiv:1506.03134v2 [stat.ML] Jan. 2, 2017, 9 pages.
Willis, et al., "Fusion 360 Gallery: A Dataset and Environment for Programmatic CAD Reconstruction", arXiv preprint arXiv:2010.02392v1 [cs.LG] Oct. 5, 2020, 11 pages.
Witkin, et al., "Reaction-Diffusion Textures", SIGGRAPH Computer Graphics, vol. 25, No. 4, Jul. 1991, pp. 299-308, 10 pages.
Worley, "A Cellular Texture Basis Function", In SIGGRAPH '96: Proceedings of the 23rd Annual Conference on Computer Graphics and Interactive Techniques, Aug. 1996, pp. 291-294, 11 pages.
Wu, et al., "DeepCAD: A Deep Generative Network for Computer-Aided Design Models", arXiv preprint arXiv:2105.09492v1 [cs. CV] May 20, 2021, 14 pages.
Yang, et al., "LayoutTransformer: Scene Layout Generation With Conceptual and Spatial Diversity", Proceedings of the IEEE/CVF Conference on Computer Vision and Pattern Recognition (CVPR), 2021, pp. 3732-3741, 10 pages.
Zhu, et al., "In-Domain GAN Inversion for Real Image Editing", arXiv preprint arXiv:2004.00049v3 [cs.CV] Jul. 16, 2020, 31 pages.

* cited by examiner

PROCEDURAL MEDIA GENERATION

BACKGROUND

The following relates generally to procedural generation, and more specifically to procedural media generation. Procedural generation refers to generating information using algorithms and a combination of random and defined variables that are provided to the algorithms as inputs.

For example, a media asset such as a texture may be generated using a set of operations structured as a directed graph. A directed graph is a graph that includes nodes and directed edges. The nodes can represent operations in a procedure. The edges can represent inputs and outputs. In a 3D rendering context, a directed graph may be created to provide information that is depicted in visual form by a 3D model. However, it is difficult and time consuming to manually create a sufficiently large procedural graph to achieve a desired level of quality in a final output. Therefore, there is a need in the art for systems and methods that can automatically create varied and high-quality media assets.

SUMMARY

Embodiments of the present disclosure provide a procedural media generation system that generates parameterized nodes and directed edges and obtains a procedural media generator including the parameterized nodes and directed edges. A parameterized node is a directed graph vertex that includes user-editable parameters, allowing a user to customize procedural media generators on the fly and in real time. The procedural media generation system then generates a media asset using the procedural media generator. By generating the media asset using the procedural media generator, the procedural media generation system provides a user with a media asset that includes the amount of information that a quality directed graph provides, but does not demand the time, effort, and expertise of a user that manually authoring a quality directed graph does.

A method, apparatus, non-transitory computer readable medium, and system for procedural media generation are described. One or more aspects of the method, apparatus, non-transitory computer readable medium, and system include generating a sequence of operator types using a node generation network; generating a sequence of operator parameters for each operator type of the sequence of operator types using a parameter generation network; generating a sequence of directed edges based on the sequence of operator types using an edge generation network; combining the sequence of operator types, the sequence of operator parameters, and the sequence of directed edges to obtain a procedural media generator, wherein the procedural media generator comprises a directed graph, and wherein each node of the directed graph comprises an operator that includes an operator type from the sequence of operator types, a corresponding sequence of operator parameters, and an input connection or an output connection from the sequence of directed edges that connects the node to another node of the directed graph; and generating a media asset using the procedural media generator.

A method, apparatus, non-transitory computer readable medium, and system for procedural media generation are described. One or more aspects of the method, apparatus, non-transitory computer readable medium, and system include identifying training data including a ground truth procedural media generator; identifying a subset of operators from the ground truth procedural media generator; predicting a next operator type using a node generation network based on the subset of operators; computing an operator type loss based on the predicted next operator type and a next operator type of the ground truth procedural media generator; and updating parameters of the node generation network based on the operator type loss.

An apparatus and system for procedural media generation are described. One or more aspects of the apparatus and system include a node generation network configured to generate a sequence of operator types; a parameter generation network configured to generate a sequence of operator parameters for each operator type of the sequence of operator types; an edge generation network configured to generate a sequence of directed edges based on the sequence of operator types; a graph component configured to combine the sequence of operator types, the sequence of operator parameters, and the sequence of directed edges to obtain a procedural media generator, wherein the procedural media generator comprises a directed graph, and wherein each node of the directed graph comprises an operator that includes an operator type from the sequence of operator types, a corresponding sequence of operator parameters, and an input connection or an output connection from the sequence of directed edges that connects the node to another node of the directed graph; and an asset generator configured to generate a media asset using the procedural media generator.

DETAILED DESCRIPTION

Figure 1:
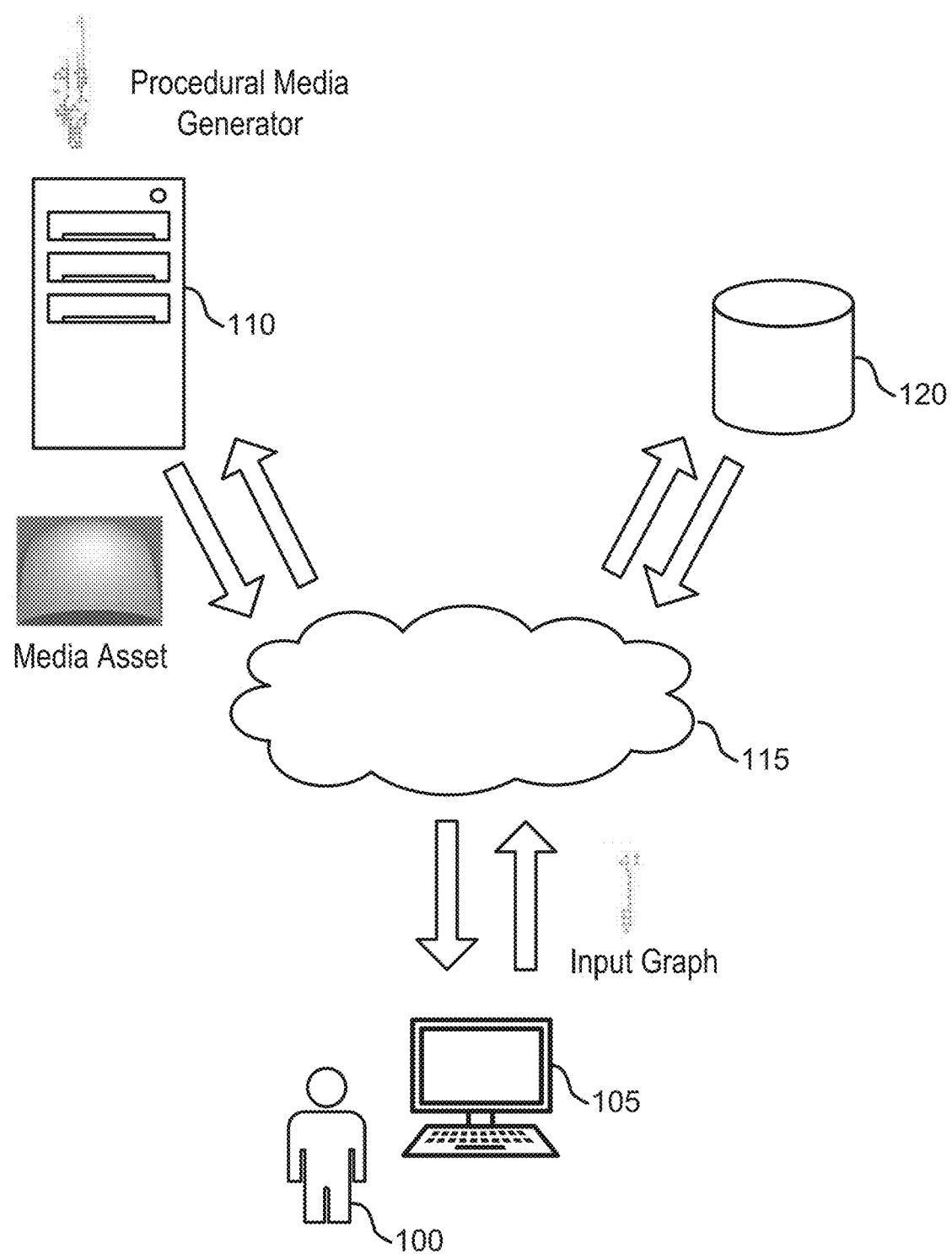
FIG. 1 shows an example of a procedural media generation system according to aspects of the present disclosure.

The present disclosure relates to the generation of procedural graphs. For example, embodiments of the disclosure relate to generating procedural graphs for the generation of textures in a 3D modelling context.

A procedural graph is a directed graph where nodes of the graph correspond to individual operations of a procedure. The edges correspond to inputs and outputs of the operations. For example, media assets such as images, materials (texture images), 3D models, sounds, etc. can be produced as the output of a directed graph of operations. The operations for generating the textures can include image processing steps that enable the generation of multiple related textures. This can save time when generating multiple textures for a 3D model.

However, manually designing a directed graph for a media asset may be a time-consuming and technically demanding process. For example, a directed graph containing information that adequately describes a media asset may include more than 50 nodes and many more edges. This complexity may discourage non-expert users from attempting to use directed graphs to generate media assets.

Embodiments of the present disclosure apply machine-learning based procedural generation techniques to automatically obtain procedural graphs, such as procedural media generators. These procedural media generators can be used to generate media assets. In one aspect, a procedural media generation apparatus includes a machine learning model including a node generation network, a parameter generation network, and an edge generation network. The node generation network generates a sequence of operator types using a node generation network, the parameter generation network generates a sequence of operator parameters for each operator type of the sequence of operator types, and the edge generation network generates a sequence of directed edges based on the sequence of operator types.

In one aspect, the procedural media generation apparatus includes a graph component that combines the sequence of operator types, the sequence of operator parameters, and the sequence of directed edges to obtain a procedural media generator. The procedural media generator includes a directed graph. Each node of the directed graph includes an operator including an operator type from the sequence of operator types, a corresponding sequence of operator parameters, and one or more input connections and output connections from the sequence of directed edges that connects the operator to another operator of the directed graph. In one aspect, the procedural media generation apparatus includes an asset generator that generates a media asset using the procedural media generator.

By using a data-driven generative model to generate operator types, operator parameters, and directed edges, and combining the operator types, operator parameters, and directed edges to obtain a procedural media generator, the procedural media generation apparatus provides a user with a directed graph that does not demand manual, expert programming from a user. Furthermore, by parameterizing the operators of the procedural media generation apparatus using the parameter generation network, the procedural media generation apparatus provides a directed graph that can be easily customized via a graphical user interface, greatly expanding a variety and number of media assets that a user can generate based on the procedural media generator.

According to some aspects, the directed graph of the procedural media generator is a material graph, and the media asset that is generated based on the material graph is a texture image. High-quality materials (e.g., texture images) may be an important ingredient in creating virtual media assets for a range of computer graphics applications including games, movies, and AR/VR, and material graphs are popular as a controllable, resolution-independent material representation. By combining geometric models with texture images, artists can create realistic and compelling virtual assets.

Conventional material design typically involves creating a material graph. Such graphs may define functions that map spatial locations to pixel values and include a set of nodes representing noise and pattern generators or operations on textures (e.g., filter kernels, transformations, etc.) and edges representing the flow of information from the output of the nodes to inputs of the subsequent nodes, finally producing image maps (e.g., roughness maps, normal maps, diffuse maps, etc.) for use in an analytic model. In some cases, the output maps can be controlled by editing parameters of the individual nodes. In some cases, conventional material authoring platforms allow users to manually combine filter nodes of a material graph representing simple image processing operations to build new material graphs that process noise and patterns to generate complex, spatially-varying materials.

However, complex material definitions regularly demand the inclusion of more than 50 nodes in a material graph, and the difficulty in manually programming such an extensive material graph may present an insurmountable obstacle to any non-expert programmer. As a result of this difficult material graph creation process, one of the largest open-sourced texture dataset includes only a few thousand such material definitions, and non-expert users may only be able to use a subset of these limited options.

Conventional approaches to easing this difficult process include procedural material design methods that fit parameters of a procedural function to an exemplar texture image, techniques using a neural version of material generators that directly outputs texture/material images, techniques using MCMC sampling to optimize parameters of procedural material models to fit a target photograph using relatively simple and hand-coded programs, techniques involving training deep neural networks to predict parameters of procedural node graphs given a captured image, and techniques involving converting procedural node graphs into differentiable programs and using stochastic gradient descent to fit graph parameters to captured images.

However, these methods either assume a target output that parameters of the material graph are then fitted to, or assume that a procedural graph (or function) is given. In contrast to these conventional methods, according to some aspects, the procedural media generation apparatus creates a new, procedurally generated material graph from scratch, does not demand any programming skill from a user, and does not assume a pre-existing media asset that the material graph is fitted to.

In recent years, deep learning generative techniques have been applied to generate models for images, animations, videos, geometry, and even low-resolution, non-parameterized image maps. However, conventional generative methods may not be directly applied to generate material graphs because of multiple challenges. First, unlike images/videos, material graphs may not have a regular structure and may include an arbitrary number of nodes of varying depths and breadths. Second, material graphs may typically include heterogeneous nodes including different numbers and types of parameters and different numbers of edge slots. Third, input and output slots in each node of a material graph may have different functional specifications based on the operator type of the node that may need to be accounted for. Lastly, material graphs may contain long chains of operations with long-range connections between distant nodes that are often critical to the appearance of the material.

Therefore, according to some aspects, the machine learning model of the procedural media generation apparatus is implemented as an autoregressive model for procedurally generating material graphs by modelling a probability distribution over a space of procedural materials and subsequently allowing sampling from this distribution. According to some aspects, the machine learning model includes transformer networks that effectively handle sparse, long-distance connections between graph nodes.

Furthermore, in order to model a complexly structured directed graph, such as a material graph, the machine learning model generates values for the directed graph in three sequential processing stages, rather than in one stage, with each processing stage being performed by a dedicated transformer network to capture dependencies. In some embodiments, a sequence of nodes is generated in the first stage, a sequence of parameters for each of the nodes is generated in the second stage, and a sequence of directed edges connecting the input and output slots of the generated nodes is generated in the third stage.

According to some aspects, the machine learning model is trained to perform an unconditional generation process, where the model outputs the values for a directed graph without requiring an initial graph input from a user. The unconditional generation process can be repeated as many times as desired, and desirable characteristics in a generated procedural media generator can be selected to be retained by a user in a subsequent procedural media generator.

According to some aspects, the procedural media generation apparatus provides a guided media asset authoring function to the user, where the procedural media generation apparatus receives an input graph and automatically completes the input graph by predicting next values in a sequences of values included in the input graph. A user can iteratively explore and refine one or more completed graphs generated by the apparatus based on the input graph, assisting the user in creating media assets that iterate on an initial concept.

As used herein, a procedural media generator refers to a set of data that is used to generate a media asset. In some embodiments, the procedural media generator includes a directed graph.

As used herein, a directed graph refers to a node graph. A node graph is an acyclic, parametric graph including parameterized nodes and directed edges that may be used to generate an asset via information included in output nodes of the node graph. Graph nodes are instances of operations including operator types and operator parameters that define named input slots, named output slots, and a set of heterogeneous parameters. An operator type describes an operation that the graph node performs, and the operation parameters of a graph node quantify values of the operation. The directed edges proceed from an output slot of a graph node to an input slot of a subsequent node to describe the flow of information in the node graph.

In some aspects, the directed graph is a material graph. A material graph provides characteristics or properties of a material (e.g., a texture image) such as roughness, weathering, albedo, color, pattern, etc.

As used herein, a media asset refers to an asset that can be generated using a directed graph. Examples of media assets include, but are not limited to, materials (e.g., texture images), other kinds of images, sounds, 3D models, videos, shapes, and text.

Figure 4:
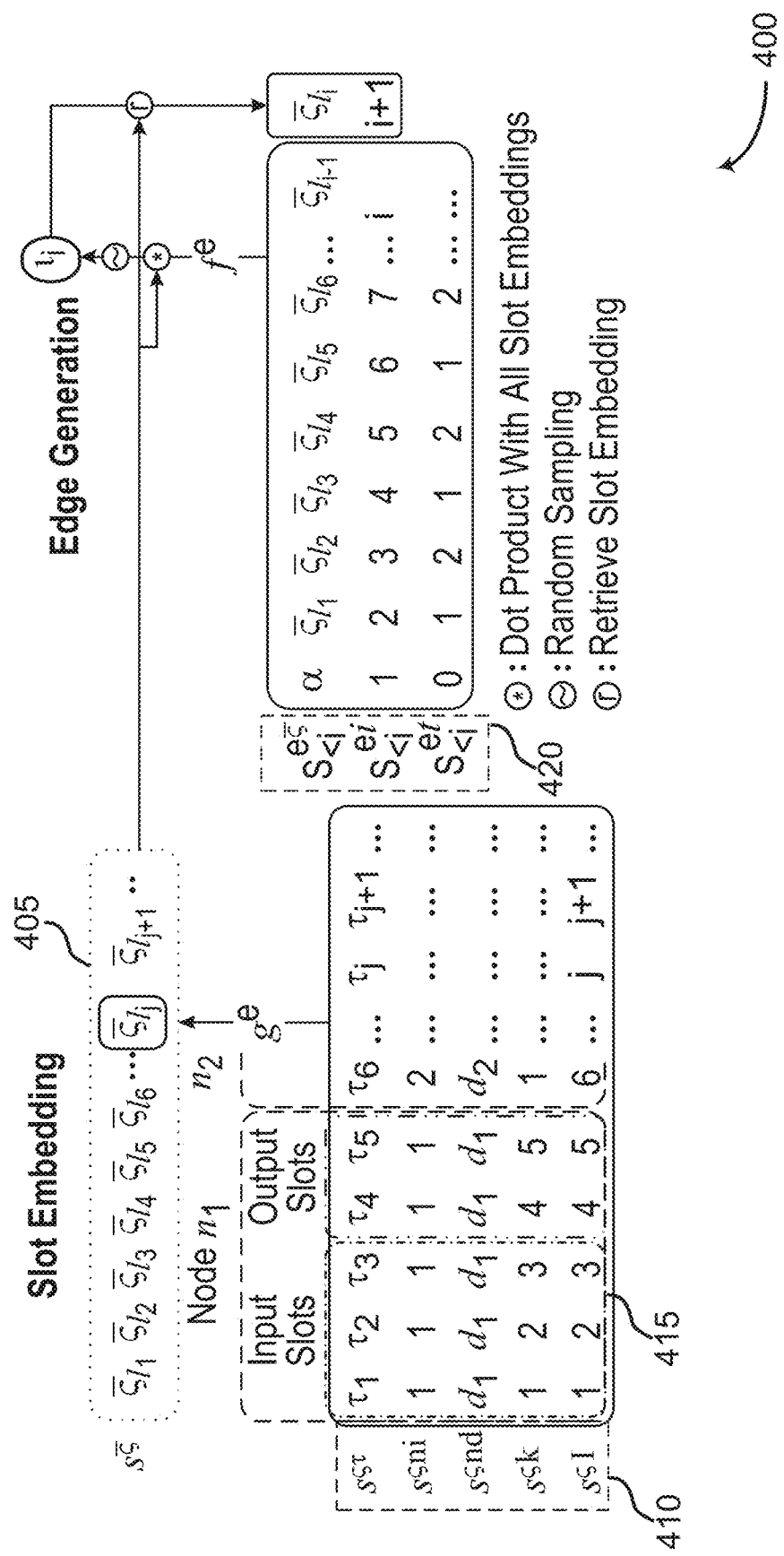
FIG. 4 shows an example of an edge generation network according to aspects of the present disclosure.
Figure 5:
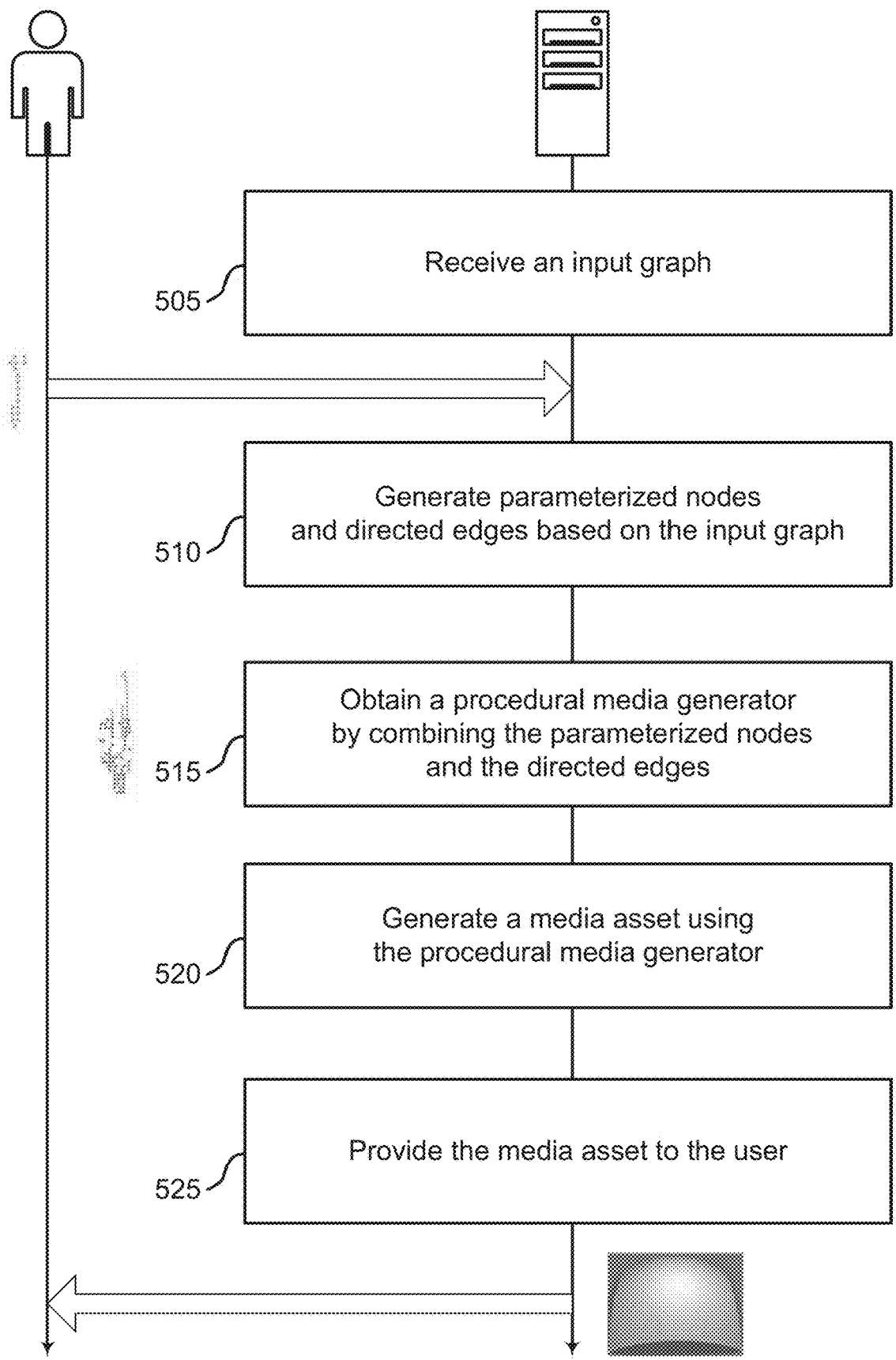
FIG. 5 shows an example of procedural media generation according to aspects of the present disclosure.

An example application of the present disclosure in a procedural generation context is provided with reference to FIGS. 1 and 5. Details regarding the architecture of a procedural media generation system are provided with reference to FIGS. 1-4. Examples of a process for procedural media generation are provided with reference to FIGS. 5-12. Examples of a process for training a machine learning model are provided with reference to FIGS. 13-15.

Procedural Media Generation System

A system and apparatus for procedural media generation is described with reference to FIGS. 1-4. One or more aspects of the system and apparatus include a node generation network configured to generate a sequence of operator types; a parameter generation network configured to generate a sequence of operator parameters for each operator type of the sequence of operator types; an edge generation network configured to generate a sequence of directed edges based on the sequence of operator types; a graph component configured to combine the sequence of operator types, the sequence of operator parameters, and the sequence of directed edges to obtain a procedural media generator, wherein the procedural media generator comprises a directed graph, and wherein each node of the directed graph comprises an operator that includes an operator type from the sequence of operator types, a corresponding sequence of operator parameters, and an input connection or an output connection from the sequence of directed edges that connects the node to another node of the directed graph; and an asset generator configured to generate a media asset using the procedural media generator.

In some aspects, the node generation network comprises a first transformer network. In some aspects, the parameter generation network comprises a second transformer network. In some aspects, the edge generation network comprises a pointer network. In some aspects, the edge generation network includes a position encoder. In some aspects, the asset generator comprises an image rendering application.

Some examples of the system and apparatus further include a training component configured to update parameters each of the node generation network, the parameter generation network, and the edge generation network.

FIG. 1 shows an example of a procedural media generation system according to aspects of the present disclosure. The example shown includes user 100, user device 105, procedural media generation apparatus 110, cloud 115, and database 120.

Referring to FIG. 1, user 100 provides an input graph to procedural media generation apparatus 110 via user device 105 and cloud 115. In an example, the input graph is a material graph, a procedural representation of a material (a texture image). Material graphs are popular among artists, but may be hard to design. For example, a material graph may not include a regular structure and may instead include an arbitrary number of heterogenous nodes including different types of parameters and numbers of edge slots having different functional specifications, connected in long chains of operations including long-distance connections between nodes that are often critical to an appearance of the material generated based on the material graph. Therefore, it may be common for a user without material graph programming experience to have a partial material graph, and the user would benefit from a system that could complete the material graph with minimal user input. Therefore, procedural media generation apparatus 110 autocompletes the input graph in a guided media asset authoring process, and generates and provides a media asset to user 100 based on the completed graph, thereby helping a novice user without a great deal of experience in authoring directed graphs to complete a project or allowing a more advanced user to explore a large variety of media assets without manually programming a number of directed graphs.

According to some aspects, user device 105 is a personal computer, laptop computer, mainframe computer, palmtop computer, personal assistant, mobile device, or any other suitable processing apparatus. In some examples, user device 105 includes software that displays a graphical user interface provided by procedural media generation apparatus 110. In some aspects, the graphical user interface provides interactive visual elements that allow user 100 to provide instructions to procedural media generation apparatus 110, such as an instruction to generate a procedural media generator and corresponding media asset from scratch, an instruction to generate a procedural media generator and corresponding media asset based on an input graph, and instructions to select and edit node parameters of a procedural media generator. In some aspects, the graphical user interface allows user 100 to upload or otherwise transfer a file including an input graph to procedural media generation apparatus 110 for procedural media generation apparatus 110 to complete in a guided media asset authoring process. In some aspects, the graphical user interface displays the procedural media generator and the media asset to the user.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

According to some aspects, procedural media generation apparatus 110 obtains a procedural media generator for generating a media asset. In some embodiments, the procedural media generator includes a directed graph. In some cases, the directed graph is a material graph that includes a set of scalar or vector image channels describing surface properties of a material, such as albedo, roughness, metallicity, surface normal, height, etc.

Generating node graphs for realistic materials poses a set of unique challenges compared to generative models in more traditional pixel-based domains. First, material graphs may not have a simple regular representation like an image grid, and their node parameters may be heterogeneous, such that each node type in the material graph includes a different set of parameters that may include scalars, vectors, and variable-length arrays. Second, material graphs may form long chains of operations that cause strong long-distance dependencies between nodes, making conventional approaches to sequence and graph generation ill-suited for the task, because information flow degrades with distance. Third, material graphs typically require a large number of nodes and node parameters. Finally, material graphs may include multiple functionally and semantically different input and output slots, and connecting an incorrect slot to a node may make the resulting material graph not only sub-optimal, but invalid.

Accordingly, in some aspects, the procedural media generation apparatus obtains information for the procedural media generator using a transformer-based machine learning model, such that information is available in equal fidelity for all parts of the directed graph. In some embodiments, the machine learning model includes an attention mechanism to shape information flow between different regions of the directed graph. Generating the information for the directed graph in one stage as a single sequence using an attention mechanism may be computationally expensive, as the attention mechanism may be quadratic the length of the sequence. Accordingly, to avoid this expense, the machine learning model respectively generates operator types, operator parameters, and directed edges in three separate processing stages. In some embodiments, each processing stage is performed by a separate transformer network. In some embodiments, the generation of the operator parameters and the directed edges is conditioned on the generated operator types.

According to some aspects, procedural media generation apparatus 110 includes a computer implemented network. In some embodiments, the computer implemented network includes the machine learning model. In some embodiments, procedural media generation apparatus 110 also includes one or more processors, a memory subsystem, a communication interface, an I/O interface, one or more user interface components, and a bus. Additionally, in some embodiments, procedural media generation apparatus 110 communicates with user device 105 and database 120 via cloud 115.

In some cases, procedural media generation apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus.

Figure 2:
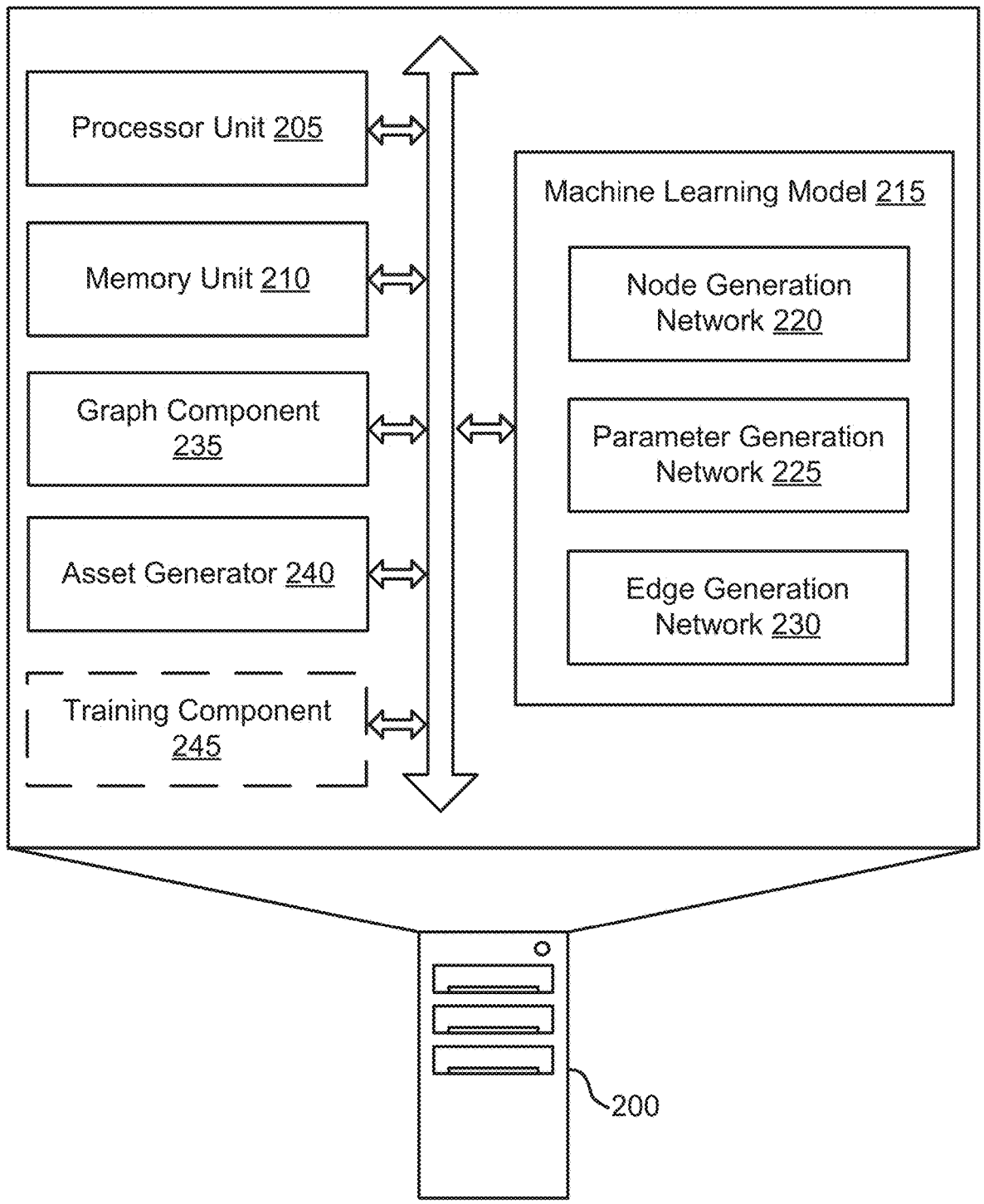
FIG. 2 shows an example of a procedural media generation apparatus according to aspects of the present disclosure.
Figure 3:
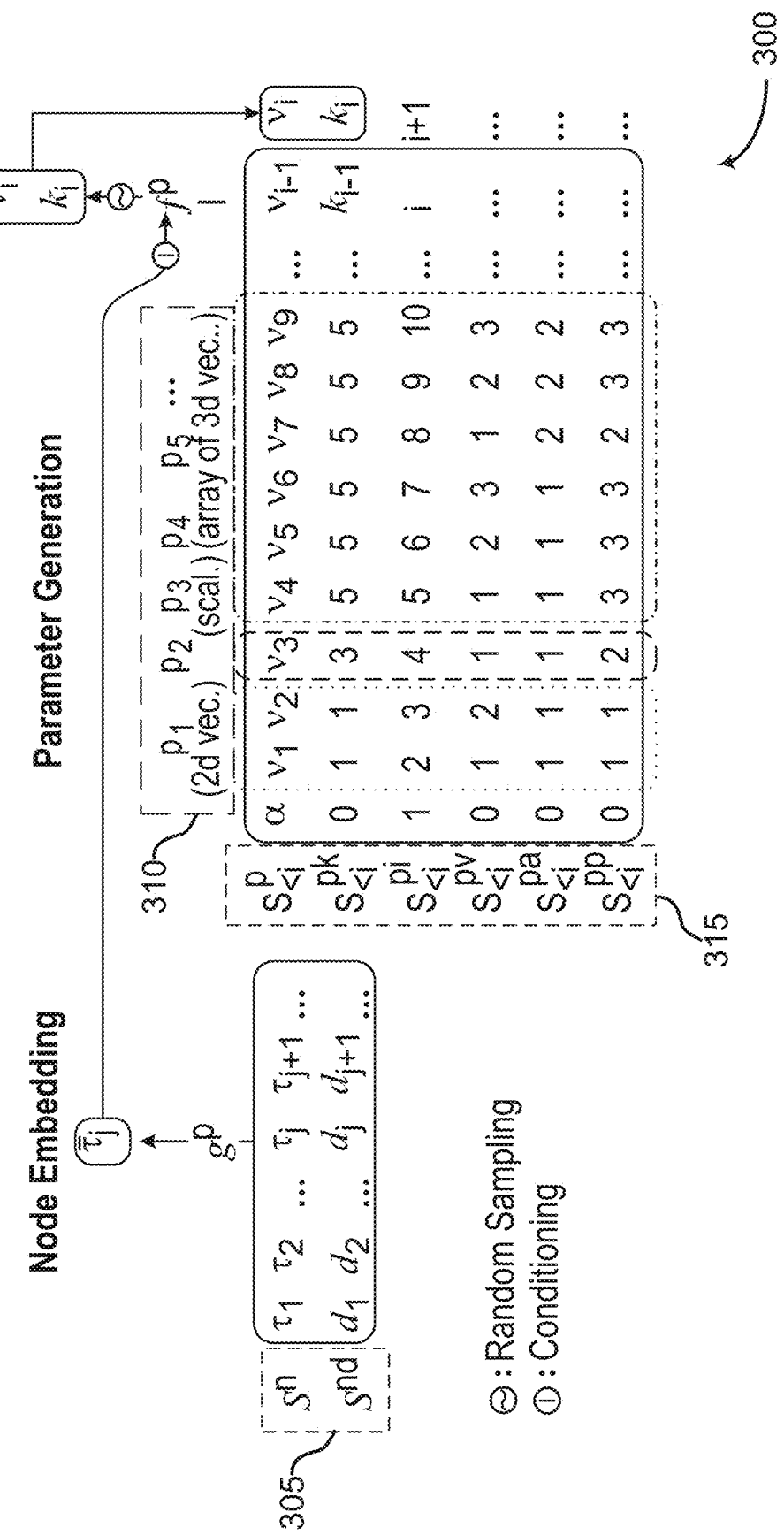
FIG. 3 shows an example of a parameter generation network according to aspects of the present disclosure.

Further detail regarding the architecture of procedural media generation apparatus 110 is provided with reference to FIGS. 2-4. Further detail regarding a process for procedural media generation is provided with reference to FIGS. 5-12. Further detail regarding a process for training the machine learning model is provided with reference to FIGS. 13-15. Procedural media generation apparatus 110 is an example of, or includes aspects of, the corresponding element described with reference to FIG. 2.

A cloud such as cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, procedural media generation apparatus 110, and database 120.

A database such as database 120 is an organized collection of data. In an example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, user 100 interacts with the database controller. In other cases, the database controller operates automatically without user interaction. According to some aspects, database 120 stores the various outputs generated by components of procedural media generation apparatus 110. In some embodiments, database 120 is external to procedural media generation apparatus 110 and communicates with procedural media generation apparatus 110 via cloud 115. In some embodiments, database 120 is included in procedural media generation apparatus 110.

FIG. 2 shows an example of a procedural media generation apparatus according to aspects of the present disclosure. Procedural media generation apparatus 200 is an example of, or includes aspects of, the corresponding element described with reference to FIG. 1. In one aspect, procedural media generation apparatus 200 includes processor unit 205, memory unit 210, machine learning model 215, graph component 235, asset generator 240, and training component 245.

Processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, machine learning model 215 is implemented as a hardware circuit, as firmware, or as software. In one aspect, machine learning model 215 includes one or more artificial neural networks (ANNs). An ANN is a hardware or a software component that includes a number of connected ANN nodes (i.e., artificial neurons) that loosely correspond to the neurons in a human brain. Each connection, or edge, transmits a signal from one ANN node to another (like the physical synapses in a brain). When an ANN node receives a signal, it processes the signal and then transmits the processed signal to other connected nodes. In some cases, the signals between ANN nodes comprise real numbers, and the output of each ANN node is computed by a function of the sum of its inputs. In some examples, ANN nodes may determine their output using other mathematical algorithms (e.g., selecting the max from the inputs as the output) or any other suitable algorithm for activating the ANN node. Each ANN node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations. During a training process of an ANN, the node weights are adjusted to improve the accuracy of the result (i.e., by minimizing a loss which corresponds in some way to the difference between the current result and the target result). The weight of an edge increases or decreases the strength of the signal transmitted between connected nodes. In some cases, ANN nodes have a threshold below which a signal is not transmitted at all. In some examples, the ANN nodes are aggregated into layers. Different layers perform different transformations on their inputs. The initial layer is known as the input layer and the last layer is known as the output layer. In some cases, signals traverse certain layers multiple times.

In one aspect, machine learning model 215 includes node generation network 220, parameter generation network 225, and edge generation network 230. In one aspect, each of node generation network 220, parameter generation network 225, and edge generation network 230 include one or more ANNs.

According to some aspects, node generation network 220 generates a sequence of operator types. In some examples, node generation network 220 generates a sequence of node depth values for the sequence of operator types, where each operator type in the sequence of operator types is generated based on a set of previous operator types and a set of previous node depth values. In some examples, node generation network 220 generates a sequence of global position values for the sequence of operator types, where each operator type in the sequence of operator types is generated based on a set of previous operator types and a set of previous global position values. According to some aspects, node generation network 220 predicts a next operator type based on the subset of operators.

According to some aspects, node generation network 220 is configured to generate a sequence of operator types. In some examples, node generation network 220 is implemented as a hardware circuit, as firmware, or as software.

In some aspects, node generation network 220 includes a first transformer network. In some embodiments, a transformer network (such as the first transformer network, a second transformer network of parameter generation network 225, and a pointer network of edge generation network 230) is a sequence generator. Unlike earlier sequence generators like GRUs and LSTMs, a transformer network uses an attention mechanism that allows the transformer network to more accurately capture long-distance relations in a sequence. In the machine learning field, an attention mechanism implements a technique of placing differing levels of importance on different elements of an input. In some aspects, calculating an attention score for an attention mechanism involves three basic steps. First, the attention mechanism computes a similarity between query and key vectors obtained from an input to generate attention weights. Similarity functions used for this process can include dot product, splice, detector, and the like. Next, the attention mechanism uses a softmax function to normalize the attention weights. Finally, the attention mechanism weights the attention weights together with their corresponding values to obtain the attention scores.

According to some aspects, a transformer network is implemented as a sequence generator $f_\theta$ that models a probability distribution over sequences S as a product of conditional probabilities over individual tokens s:

$$p(S \mid \theta) := \prod_i p(s_i \mid s_{<i}, \theta) \qquad 1)$$

where $s_{<i} := s_1, \ldots, s_{i-1}$ denotes a partial token sequence up to a token $s_{i-1}$. The sequence generator $f_\theta$ estimates a probability distribution over the possible value assignments for token $s_i$, conditioned on the partial token sequence: $p(s_i \mid s_{<i}, \theta) = f_\theta(s_{<i})$. After the sequence generator $f_\theta$ is trained, the sequence generator $f_\theta$ samples the predicted distribution to obtain the token $s_i$. According to some aspects, a complete token sequence can then be generated by repeatedly evaluating the sequence generator $f_\theta$, starting from a special starting token $\alpha$ and growing the partial sequence by one token in each step until a special stopping token $\omega$ is generated or a maximum sequence length is reached. According to some aspects, sequence generators are applied to multiple parallel sequences, denoted as $p_i^a$, $p_i^b = f_\theta(s_{<i}^a, s_{<i}^b)$, where $p*_i$ is short for $p(s*_i \mid s*_{<i}, \theta*)$.

According to some aspects, nodes, node parameters, and edges are each generated as a sequence of discrete tokens $S = (s_1, \ldots, s_m)$, one token $s_i$ at a time, as described with reference to FIG. 6. According to some aspects, some value choices for a given token may be semantically invalid. For example, a token that describes an end point of an edge should not refer to input slots that are already occupied by another edge. Therefore, in some embodiments, probabilities $p(s_i \mid s_{<i}, \theta)$ generated for invalid choices are set to zero, and remaining probabilities are renormalized. In some examples, the first transformer network is implemented as a hardware circuit, as firmware, or as software.

According to some aspects, the first transformer network is implemented as a GPT-2 model, a machine learning model that uses natural language processing techniques to synthesize a next item in an arbitrary sequence. According to some aspects, the first transformer network is implemented as various other suitable transformer models.

In some aspects, node generation network 220 includes a first position encoder. A position encoder provides a positional encoding including additional sequences that are used as input to a subsequent network, but do not need to be generated, as they can be derived from other sequences. A positional encoding is application-specific and provides additional context for each token in a sequence, such as a sequence index of a token. In some embodiments, the first position encoder is implemented as a hardware circuit, as firmware, or as software.

According to some aspects, parameter generation network 225 generates a sequence of operator parameters for each operator type of the sequence of operator types. In some aspects, each value in the sequence of operator parameters corresponds to a different parameter type. In some aspects, one or more values in the sequence of operator parameters corresponds to a same parameter type. According to some aspects, parameter generation network 225 predicts a sequence of operator parameters for an operator type based on the sequence of operator types.

According to some aspects, parameter generation network 225 is configured to generate a sequence of operator parameters for each operator type of the sequence of operator types. In some aspects, the parameter generation network 225 includes the second transformer network. In some embodiments, the second transformer network includes a similar architecture as the first transformer network of node generation network 220.

According to some aspects, parameter generation network 225 includes a first sequence encoder. In some embodiments, the first sequence encoder is a transformer-based encoder with a similar architecture to the second transformer network, but receives a whole token sequence and a token index as input at each processing step and outputs an embedding of a token that includes information corresponding to the whole sequence: $\bar{S}_i := g_\phi(i, S)$, where $\bar{s}_i$ is a sequence-aware embedding of the token $s_i$.

In some aspects, parameter generation network 225 includes a second position encoder including a similar architecture as the first position encoder of node generation network 220. In some examples, parameter generation network 225, the second transformer network, the first sequence encoder, and the second position encoder are implemented as one or more hardware circuits, as firmware, or as software. According to some aspects, each of the second transformer network and the first sequence encoder is implemented as a GPT-2 model or as various other suitable transformer models. Parameter generation network 225 is an example of, or includes aspects of, the corresponding element described with reference to FIG. 3.

According to some aspects, edge generation network 230 generates a sequence of directed edges based on the sequence of operator types. In some examples, edge generation network 230 identifies a set of slots corresponding to input slots and output slots of the sequence of operator types. In some examples, edge generation network 230 computes a slot embedding for each of the set of slots. In some examples, edge generation network 230 generates a sequence of slot indices based on the slot embeddings, where each pair of consecutive indices corresponds to a directed edge in the sequence of directed edges. According to some aspects, edge generation network 230 predicts one or more directed edges based on the subset of operators.

According to some aspects, edge generation network 230 is configured to generate a sequence of directed edges based on the sequence of operator types. In some aspects, the edge generation network 230 includes the pointer network. In some aspects, the pointer network is a transformer-based network including a similar architecture to the first transformer network of node generation network 220, but outputs a feature vector in each processing step instead of a probability distribution.

In some aspects, edge generation network 230 includes a second sequence encoder. In some embodiments, the second sequence encoder includes a similar architecture as the first sequence encoder of parameter generation network 225. In some aspects, edge generation network 230 includes a third position encoder. In some embodiments, the third position encoder includes a similar architecture as the first position encoder of node generation network 220.

In some examples, edge generation network 230, the pointer network, the second sequence encoder, and the third position encoder are implemented as one or more hardware circuits, as firmware, or as software. According to some aspects, each of the pointer network and the second sequence encoder is implemented as a GPT-2 model or as various other suitable transformer models. Edge generation network 230 is an example of, or includes aspects of, the corresponding element described with reference to FIG. 4.

According to some aspects, graph component 235 combines the sequence of operator types, the sequence of operator parameters, and the sequence of directed edges to obtain a procedural media generator, where the procedural media generator includes a directed graph, and where each node of the directed graph includes an operator that includes an operator type from the sequence of operator types, a corresponding sequence of operator parameters, and one or more input connections and output connections from the sequence of directed edges that connects the node to another node of the directed graph. In some examples, some nodes have multiple input connections, multiple output connections, or both.

In some examples, graph component 235 identifies an input graph. In some examples, graph component 235 combines the input graph with the directed graph to obtain the procedural media generator. In some examples, graph component 235 selects a subset of nodes of the directed graph. In some examples, graph component 235 generates additional nodes based on the subset of the nodes. In some examples, graph component 235 generates a subsequent procedural media generator including the subset of the nodes and the additional nodes based on the subset of the nodes. In some examples, graph component 235 generates a set of material graphs.

According to some aspects, graph component 235 is configured to combine the sequence of operator types, the sequence of operator parameters, and the sequence of directed edges to obtain a procedural media generator, wherein the procedural media generator comprises a directed graph, and wherein each node of the directed graph comprises an operator that includes an operator type from the sequence of operator types, a corresponding sequence of operator parameters, and an input connection or an output connection from the sequence of directed edges that connects the node to another node of the directed graph. In some examples, graph component 235 is implemented as a hardware circuit, as firmware, or as software.

According to some aspects, asset generator 240 generates a media asset using the procedural media generator. In some examples, asset generator 240 generates a subsequent media asset based on the subsequent procedural media generator. In some examples, asset generator 240 generates a texture image using the procedural media generator, where the directed graph includes a material graph and the media asset includes an image that includes the texture image. In some examples, asset generator 240 generates a set of texture images based on the set of material graphs, where the media asset includes the set of texture images. In some examples, asset generator 240 generates a geometry model using the procedural media generator, where the media asset includes an image that depicts a shape based on the geometry model.

According to some aspects, asset generator 240 is configured to generate a media asset using the procedural media generator. In some examples, asset generator 240 is implemented as a hardware circuit, as firmware, or as software. In some aspects, asset generator 240 includes an image rendering software application.

According to some aspects, training component 245 identifies training data including a ground truth procedural media generator. In some examples, training component 245 identifies a subset of operators from the ground truth procedural media generator. In some examples, training component 245 computes an operator type loss based on the predicted next operator type and a next operator type of the ground truth procedural media generator. In some examples, training component 245 updates parameters of the node generation network 220 based on the operator type loss.

In some examples, training component 245 identifies a topological node ordering for the ground truth procedural media generator. In some examples, training component 245 compares the predicted next operator type and the next operator type of the ground truth procedural media generator based on the topological node ordering, where the operator type loss is based on the comparison. In some aspects, the topological node ordering includes a back-to-front breadth-first traversal of the ground truth procedural media generator.

In some examples, training component 245 computes a parameter loss based on the predicted sequence of operator parameters and a sequence of operator parameters from the ground truth procedural media generator. In some examples, training component 245 updates parameters of the parameter generation network 225 based on the parameter loss.

In some examples, training component 245 computes a directed edge loss based on the predicted directed edge and a sequence of directed edges from the ground truth procedural media generator. In some examples, training component 245 updates parameters of the edge generation network 230 based on the directed edge loss.

According to some aspects, training component 245 is configured to update parameters of each of the node generation network 220, the parameter generation network 225, and the edge generation network 230. In some examples, training component 245 is implemented as a hardware circuit, as firmware, or as software. According to some aspects, training component 245 is omitted from procedural media generation apparatus 200 and is included in an external device configured to train procedural media generation apparatus via training component 245. In this case, training component 245 communicates information with procedural media generation apparatus 200 via a cloud described with reference to FIG. 1 and/or other suitable communication networks, techniques, and protocols.

FIG. 3 shows an example of a parameter generation network 300 according to aspects of the present disclosure. Parameter generation network 300 is an example of, or includes aspects of, the corresponding element described with reference to FIG. 2.

Referring to FIG. 3, parameter generation network 300 is conditioned on sequences provided by a node generation network described with reference to FIG. 2 to generate a set of flattened sequences of operator parameters for use in a procedural media generator.

According to some aspects, parameter generation network 300 includes first sequence encoder $g_p$ and second transformer network $f_p$ described with reference to FIG. 2. In some cases, first sequence encoder $g_p$ performs node embedding based on first sequences 305, including sequence $S^n$ and sequence $S^{nd}$ generated by a node generation network described with reference to FIG. 2 to obtain a sequence-aware embedding $\bar{\tau}_j$. In some cases, second transformer network $f_p$ flattens node vector parameters 310 into a set of sequences 315, where parameters with non-default values are added to a sequence in the set of sequences 315. In some embodiments, sequences of the set of sequences 310 are generated one token at a time. In some cases, the second transformer network $f_p$ is conditioned on the sequence-aware embedding $\bar{\tau}_j$ that is computed by the first sequence encoder $g^p$. In some cases, parameter generation network identifies which node parameter a given value $v_i$ refers to by defining a second sequence $S^{pk}=(0, k_1, k_2, \ldots, \theta)$ of indices k into the full list of node parameters, such that a value $v_i$ corresponds to a node parameter with index $k_i$. The operations of parameter generation network 300 are described in further detail with reference to FIG. 6.

FIG. 4 shows an example of an edge generation network 400 according to aspects of the present disclosure. Edge generation network 400 is an example of, or includes aspects of, the corresponding element described with reference to FIG. 2.

Referring to FIG. 4, edge generation network 400 includes a transformer-based model to generate a sequence of directed edges based on a sequence of operator types for use in a procedural media generator.

According to some aspects, edge generation network 400 includes third sequence encoder $g^e$ and pointer network $f^e$ described with reference to FIG. 2. In some cases, third sequence encoder $g^e$ computes slot embeddings 405 based on a set of sequences 410 that uniquely identify each slot and that reference input/output slots 415. In some cases, pointer network $f^e$ computes a slot index $l_i$ based on sequences 420 including index tuples that reference the sequence of input/output slots 415. In some cases, edge generation network 400 computes affinities between the feature vector and slot embeddings 315 by computing a dot product between each slot embedding 315 and the feature vector. In some cases, edge generation network randomly samples a distribution that is computed based on the dot products to obtain the slot index $l_i$. The operations of edge generation network 400 are described in further detail with reference to FIG. 6.

Procedural Media Generation

A method for procedural media generation is described with reference to FIGS. 5-12. One or more aspects of the method include generating a sequence of operator types using a node generation network; generating a sequence of operator parameters for each operator type of the sequence of operator types using a parameter generation network; generating a sequence of directed edges based on the sequence of operator types using an edge generation network; combining the sequence of operator types, the sequence of operator parameters, and the sequence of directed edges to obtain a procedural media generator, wherein the procedural media generator comprises a directed graph, and wherein each node of the directed graph comprises an operator that includes an operator type from the sequence of operator types, a corresponding sequence of operator parameters, and an input connection or an output connection from the sequence of directed edges that connects the node to another node of the directed graph; and generating a media asset using the procedural media generator.

Some examples of the method further include generating a sequence of node depth values for the sequence of operator types, wherein each operator type in the sequence of operator types is generated based on a set of previous operator types and a set of previous node depth values. Some examples of the method further include generating a sequence of global position values for the sequence of operator types, wherein each operator type in the sequence of operator types is generated based on a set of previous operator types and a set of previous global position values. In some aspects, each value in the sequence of operator parameters corresponds to a different parameter type. In some aspects, one or more values in the sequence of operator parameters corresponds to a same parameter type.

Some examples of the method further include identifying a plurality of slots corresponding to input slots and output slots of the sequence of operator types. Some examples further include computing a slot embedding for each of the plurality of slots. Some examples further include generating a sequence of slot indices based on the slot embeddings, wherein each pair of consecutive indices corresponds to a directed edge in the sequence of directed edges.

Some examples of the method further include identifying an input graph. Some examples further include combining the input graph with the directed graph to obtain the procedural media generator. Some examples of the method further include selecting a subset of nodes of the directed graph. Some examples further include generating additional nodes based on the subset of the nodes. Some examples further include generating a subsequent procedural media generator including the subset of the nodes and the additional nodes based on the subset of the nodes. Some examples further include generating a subsequent media asset based on the subsequent procedural media generator.

Some examples of the method further include generating a texture image using the procedural media generator, wherein the directed graph comprises a material graph and the media asset comprises an image that includes the texture image. Some examples of the method further include generating a plurality of material graphs. Some examples further include generating a plurality of texture images based on the plurality of material graphs, wherein the media asset includes the plurality of texture images. Some examples of the method further include generating a geometry model using the procedural media generator, wherein the media asset comprises an image that depicts a shape based on the geometry model.

FIG. 5 shows an example of procedural media generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, the system autocompletes a user-provided input graph in a guided media asset authoring process and provides a media asset to the user based on the completed graph, thereby helping a novice user to complete a project or allowing a more advanced user to explore a large variety of media assets. In an example, the input graph is a material graph, a procedural representation of a material (a texture image). Material graphs are popular among artists, but may be hard to design. For example, a material graph may not include a regular structure and may instead include an arbitrary number of heterogenous nodes including different types of parameters and numbers of edge slots having different functional specifications, connected in long chains of operations including long-distance connections between nodes that are often critical to an appearance of the material generated based on the material graph.

Therefore, it may be common for a user without material graph programming experience to have a partial material graph, and the user would benefit from a system that could complete the material graph with minimal user input. Therefore, the system autocompletes the input graph in a guided media asset authoring process, and generates and provides a media asset to the user based on the completed graph, thereby helping a novice user without a great deal of experience in authoring directed graphs to complete a project or allowing a more advanced user to explore a large variety of media assets without manually programming a number of directed graphs.

At operation 505, the system receives an input graph. In some cases, the operations of this step refer to, or may be performed by, a procedural media generation apparatus as described with reference to FIGS. 1 and 2. In an example, the input graph is a directed graph described with reference to FIG. 6. In some cases, the procedural media generation apparatus provides a graphical user interface via a display of the procedural media generation apparatus or a display of the user device that enables the user to interact with functions of the procedural media generation apparatus and upload or otherwise transfer a file including the input graph to the procedural media generation apparatus. In this case, the input graph is a material graph that corresponds to a media asset that includes a texture image.

At operation 510, the system generates parameterized nodes (e.g., nodes that include operator types and operator parameters corresponding to the operator types) and directed edges based on the input graph. In some cases, the operations of this step refer to, or may be performed by, a procedural media generation apparatus as described with reference to FIGS. 1 and 2. For example, the procedural media generation apparatus generates the parameterized nodes and the directed edges as described with reference to FIG. 6, using the values included in the input graph as initial sequence values as described with reference to FIG. 6.

At operation 515, the system obtains a procedural media generator by combining the parameterized nodes and the directed edges. In some cases, the operations of this step refer to, or may be performed by, a procedural media generation apparatus as described with reference to FIGS. 1 and 2. For example, the procedural media generation apparatus combines the parameterized nodes and the directed edges as described with reference to FIG. 6 to obtain the procedural media generator, where the procedural media generator includes a directed graph that includes the parameterized nodes connected by the directed edges. In this case, the directed graph is a material graph that provides characteristics or properties of a material (e.g., a texture image) such as roughness, weathering, albedo, color, pattern, etc.

At operation 520, the system generates a media asset using the procedural media generator. In some cases, the operations of this step refer to, or may be performed by, a procedural media generation apparatus as described with reference to FIGS. 1 and 2. For example, the procedural media generation apparatus generates a media asset that depicts the characteristics provided by the directed graph included in the procedural media generator. In this case, the media asset is a texture image that includes the properties provided by the generated material graph.

At operation 525, the system provides the media asset to the user. In some cases, the operations of this step refer to, or may be performed by, a procedural media generation apparatus as described with reference to FIGS. 1 and 2. For example, the procedural media generation apparatus displays the media asset to the user in the graphical user interface and provides the user with an option to save the media asset, either as a local download or in cloud storage.

Figure 6:
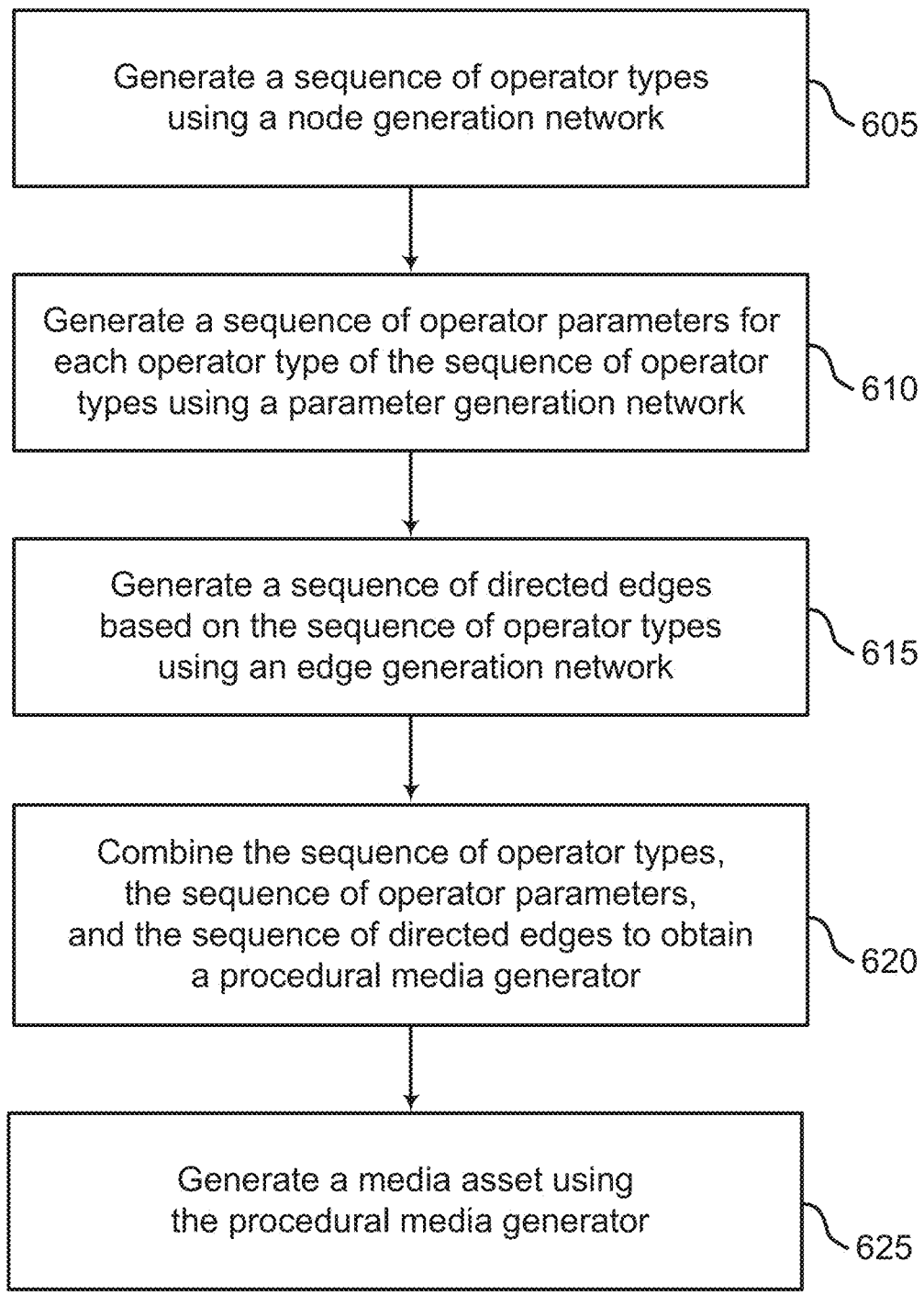
FIG. 6 shows an example of generating a media asset according to aspects of the present disclosure.

FIG. 6 shows an example of generating a media asset according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the system generates multiple token sequences that represent a node graph of a procedural media generator, combines the multiple token sequences to obtain the procedural media generator, and generates a media asset using the procedural media generator.

In some cases, a node graph is a preferred technique for artists to represent information that is used to characterize a media asset (such as a texture image). In an example, the artist can provide a node graph to a rendering application, and the rendering application can output a media asset based on the information included in the node graph. However, node graphs that include a sufficient amount of information to characterize a quality media asset may be difficult and time-consuming to program and design. Therefore, according to some aspects, the system generates an arbitrary number of diverse, high-quality node graphs from scratch, enabling a user to experiment with an almost unlimited number of media assets, and also enabling dataset augmentation for training tasks that rely on node graphs. Furthermore, according to some aspects, the system provides a user with a guided media asset authoring process where the system automatically completes an input graph that the user provides to the system, thereby allowing the user to finish a project with minimal user input.

According to some aspects, the procedural media generator includes a node graph g. As used herein, a node graph is a directed graph including nodes and directed edges and is a parametric model that generates an output given the parameters of each node. Nodes are instances of operations that define named input slots, named output slots, and a set of heterogeneous parameters. Directed edges from output slots to input slots describe the flow of information in the node graph, such that an output of a given node is used as input by another node. A node graph is a representation of a functional program, where functions with multiple input and output arguments are represented by nodes. The output arguments correspond to output slots of a node, while the input arguments are split into parameters (which can be constants) and input slots, which can be arguments that are outputs of other, preceding functions. In some embodiments, loops are omitted from a node graph.

In some embodiments, the node graph g=(N, E) is a directed acyclic multigraph of media asset operators comprising a set of nodes N={$n_1$, $n_2$, ... } and edges E={$e_1$, $e_2$, ... }. Given a set of node parameters, the procedural media generator outputs a set of media asset channels that numerically describe one or more characteristics of a media asset. An example media asset is a texture image. Example media asset channels include material channels for a texture image, such as albedo and roughness.

In some embodiments, nodes n=($\tau$, P) are instances of image operators and are defined by an operator type $\tau$ and a set of operator parameters P. In some embodiments, the operator type $\tau$ is an index int a library of image operators O=($o_1$, $o_2$, ... ) that each take in a set of parameters and a set of images and output a set of images. In some embodiments, a k-th operator is thus a function mapping input images into output images:

$$(I_1^{out}, I_2^{out}, \ldots) = o_k(I_1^{in}, I_2^{in}, \ldots |P), \text{ with } P=(p_1, p_2, \ldots) \quad (2)$$

where each I is a grayscale or RGB image and $p_j$ is a parameter that may be a scalar, vector, or variable-length array of vectors. In some embodiments, a number of input images, a number of output images, and a number and type of parameters are therefore provided by the nodes (operators).

According to some aspects, a node $n_i$ of type $\tau_i$ has input slots ($in_1^i$, $in_2^i$, ... ) and output slots ($out_1^i$, $out_2^i$, ... ), where edges of the procedural media generator can attach to the input slots and output slots to provide input media assets and receive output media assets, respectively. A node that does not define an input media asset is referred to as a generator node.

According to some aspects, directed edges e=($out_k^i$, $in_l^j$) numerically describe a flow of information in the node graph from output slots to input slots. For example, an output image $I_k^{out}$ of node $n_i$ may be used as input $I_l^{in}$ of node $n_j$. In some embodiments, an input slot only accepts a single input image, and so each input slot corresponds to one or zero incoming edges. In some embodiments, output slots correspond to an arbitrary number of outgoing edges.

At operation 605, the system generates a sequence of operator types using a node generation network. In some cases, the operations of this step refer to, or may be performed by, a node generation network as described with reference to FIG. 2.

In an example, the node generation network generates operator types $\tau$ of all nodes n=($\tau$, P) in a graph as sequence $S^n$=($\alpha$, $\tau_1$, $\tau_2$, ... , $\omega$) using a transformer-based model $f^n$ (e.g., the first transformer network described with reference to FIG. 2), where $\alpha$ and $\omega$ are sequence starting and stopping tokens.

According to some aspects, the node generation network generates a sequence of node depth values for the sequence of operator types, wherein each operator type in the sequence of operator types is generated based on a set of previous operator types and a set of previous node depth values. In some embodiments, the node generation network generates the sequence of node depth values using a canonical ordering that provides more consistency between data samples. However, a canonical sequence may be relatively inflexible, as it may limit a diversity of partial sequences S<i that the machine learning model is trained on.

In some embodiments, the node generation network generates a sequence of node depth values for the sequence of operator types using alternative ordering. In some embodiments, the alternative ordering is a back-to-front breadth-first traversal ordering, starting from output nodes, moving opposite to edge directions from child nodes to parent nodes, and traversing the parents in the order of a node's input slots. In some embodiments, back-to-front breadth-first traversal ordering is used during an unconditional generation process in which information for a procedural media generator is generated from scratch. In some embodiments, the alternative ordering is a reversed back-to-front breadth-first traversal ordering, in which the sequence is ordered from a last node to a first node of the back-to-front breadth-first traversal. In some embodiments, the reversed back-to-front breadth-first traversal ordering is used during a guided media asset authoring process in which a user provides a partial input graph for the procedural media generation apparatus to complete.

In some embodiments, the alternative ordering is a front-to-back breadth-first traversal ordering, in which child nodes of a parent node are visited in an order of the parent node's output slots, and the order of children that are connected to a same output slot is randomized In some embodiments, the alternative is a random topological ordering.

According to some aspects, the node generation network generates a sequence of global position values for the sequence of operator types, wherein each operator type in the sequence of operator types is generated based on a set of previous operator types and a set of previous global position values. In an example, a first position encoder of the node generation network generates a sequence $S^{ni}$=(1, 2, 3, ... ) providing a global position of a token in the sequence $S^n$ and generates a sequence $S^{nd}$=(0, $d_1$, $d_2$, ... ,0) describing a depth of each node in a directed graph, where $d_i$ is the graph distance from a node $n_i$ to a closest output node in the back-to-front breadth-first traversal ordering or a distance to a closest generator node for all other orderings. In some embodiments, as the depth of a node is not obtained from the sequence $S^n$ alone, the node generation network estimates the depth as an additional output sequence during generation. In some embodiments, the first transformer network $f^n$ uses $S^n$, $S^{ni}$, and $S^{nd}$ as partial input sequences and outputs probabilities for the next operator type and depth:

$$p_i^n, p_i^{nd} = f^n(s_{<i}^n, s_{<i}^{nd}, s_{<i}^{in}) \quad (3)$$

At operation 610, the system generates a sequence of operator parameters for each operator type of the sequence of operator types using a parameter generation network. In some cases, the operations of this step refer to, or may be performed by, a parameter generation network as described with reference to FIGS. 2 and 3.

In an example, the parameter generation network generates parameters P of nodes n=($\tau$, P) as a sequence $S^p$=($\alpha$, $v_1$, $v_2$, ... , $\omega$) of scalar values v using the transformer-based model $f^p$ (e.g., the second transformer network described with reference to FIG. 2), where $\alpha$ and $\omega$ are the sequence starting and stopping tokens. According to some aspects, the operator parameters are heterogeneous and are scalars, vectors, or variable-length arrays of vectors. In some embodiments, the parameter generation network flattens all operator parameters corresponding to a node into a single sequence of scalars. In some embodiments, the parameter generation network generates one parameter sequence per node in a graph. In some embodiments, each value in the sequence of operator parameters corresponds to a different parameter type. In some embodiments, one or more values in the sequence of operator parameters corresponds to a same parameter type. In some embodiments, the parameter generation network sorts the parameters alphabetically by name. In some embodiments, the parameter generation network uniformly quantizes a continuous operator parameter between a minimum and maximum observed value such that the quantized values correspond to discrete token values. According to some embodiments, the parameter generation network uses 32 quantization levels.

According to some aspects, each value in the sequence of operator parameters corresponds to a different parameter type. In an example, a parameter value $P_i$ corresponds to an operator type $\tau_i$ of a node $n_i$ and, to a lesser extent, other nodes in the sequence $S^n$. In some embodiments, the parameter generation network generates each sequence $S^P$ conditioned on a sequence-aware embedding $\bar{\tau}_j$ of the operator type $\tau_j$ that also includes information about the other nodes in the scene.

In some embodiments, to condition the second transformer network $f^P$ on a feature vector (such as sequence-aware embedding $\bar{\tau}_j$), the second transformer network $f^P$ includes three layers added to each feed-forward block. In some embodiments, an original feed-forward block performs the following operations:

$$\text{FFBlock}(x) := x + \text{MLP}(\text{LN}(x)) \quad (4)$$

where x is the input feature vector, MLP is a Multilayer Perceptron, and LN is Layer Normalization. In some embodiments, the original feed-forward block is modified to receive the condition as additional feature vector c:

$$\text{CFFBlock}(x,c) := \text{FFBlock}(x) + \text{MLP}(\text{LN}(c)) \quad (5)$$

In some embodiments, a transformer-based encoder $\bar{\tau}_j = g^P(j, S^n, S^{nd})$ (e.g., the first sequence encoder described with reference to FIG. 2) is jointly trained with the second transformer network $f^P$ and computes the sequence-aware embedding $\bar{\tau}_j$.

According to some aspects, a second position encoder of the parameter generation network generates a positional encoding. In some embodiments, the positional encoding includes a global token position sequence $S^{pi}$ and sequences $S^{pv}$, $S^{pa}$, $S^{pp}$ that respectively describe an index of a vector element, an index of an array element, and an index of a parameter associated with a token. The parameter generation network generates probabilities over parameter values and indices:

$$p_i^P, p_i^{pk} = f^P(s_{<i}^P, s_{<i}^{pk}, s_{<i}^{pi}, s_{<i}^{pv}, s_{<i}^{pa}, s_{<i}^{pp} | \bar{\tau}) \quad (6)$$

According to some aspects, the parameter generation network is trained to only generate node parameters that are not at their default values. In these cases, the parameter generation component leaves the unedited operator parameters at default values, shortens the sequence $S^P$ by only including edited operator parameters in the sequence $S^P$, and generates a second sequence $S^{pk} = (0, k_1, k_2, \ldots, 0)$ of indices k into the full list of node parameters, such that a value $v_i$ corresponds to a node parameter with index $k_i$.

According to some aspects, in order to perform a semantic validity check for operator parameter generation, the value of discrete parameters is constrained within their valid range, and parameter indices in the sequence $S^{pK}$ are constrained to not exceed the number of number of parameters in the corresponding operator $o_\tau$.

At operation 615, the system generates a sequence of directed edges based on the sequence of operator types using an edge generation network. In some cases, the operations of this step refer to, or may be performed by, an edge generation network as described with reference to FIGS. 2 and 4. In an example, the edge generation network generates all edges e=(out, in) in a graph as a sequence $S^e = (\alpha, l_1, l_2, l_3, l_4, \ldots, \omega)$ of slot indices using a transformer-based model $f^e$ (e.g., the pointer network described with reference to FIG. 2), where each pair of consecutive indices forms an edge.

According to some aspects, the edge generation network identifies a set of slots corresponding to input slots and output slots of the sequence of operator types. In an example, the edge generation network identifies a sequence of all input and output slots in a graph, and identifies an edge as a pair of input and output indices in the sequence.

According to some aspects, the edge generation network computes a slot embedding for each slot of the set of slots. In a comparative example, a straightforward approach to edge generation is generating a sequence of slot indices directly using a standard transformer generator. However, this may not give the transformer generator any information about the slots in the graph, and it would be difficult for the transformer generator to reason about slot connectivity.

Instead, according to some aspects, the transformer-based model $f^e$ operates in the space of learnt slot embeddings. In some embodiments, using a transformer-based encoder $g^e$ of the edge generation network (e.g., the third sequence encoder described with reference to FIG. 2), the edge generation network computes embeddings $\varsigma \bar{\varsigma} = (\varsigma_1, \varsigma_2, \ldots)$ for each slot from multiple input sequences that together uniquely describe each slot in a node graph, where sequence of operator types $\varsigma^{\varsigma\tau}$, sequence of node indices $\varsigma^{\varsigma ni}$, and sequence of node depths $\varsigma^{\varsigma nd}$ provide information corresponding to a node associated with each slot, sequence $S^{\varsigma k}$ provides an index of a slot inside a node, and global token position sequence $S^{\varsigma i}$ provides additional positional encoding. The edge generation network then computes the slot embedding $\varsigma_j = g^e(j, S^{\varsigma\tau}, S^{\varsigma ni}, S^{\varsigma nd}, S^{\varsigma k}, S^{\varsigma i})$.

According to some aspects, the edge generation network generates a sequence of slot indices based on the slot embeddings, wherein each pair of consecutive indices corresponds to a directed edge in the sequence of directed edges. For example, in some embodiments, the edge generation network includes a pointer network $f^e$ that outputs a feature vector $I_i$ in each processing step instead of a probability distribution, where the feature vector $I_i$ is a query into the list of slot embeddings $S \bar{\varsigma}$. The edge generation network computes affinities between the query and the embeddings as dot products and normalizes the dot products into a probability distribution:

$$p_i^e = \text{Softmax}_j(\varsigma_j \cdot I_i) \quad (7)$$

where "·" denotes the dot product and $\text{Softmax}_j$ denotes the softmax over all indices j. The edge generation network samples this distribution over the slots to obtain the slot index $l_i$. In some cases, a partial sequence of slot embeddings selected in previous processing steps, $S^e \bar{\varsigma}$, is used as input to $f^e$, thereby providing the edge generation network information about existing edges. For example, in some cases, $f^e$ generates slot pairs (e.g., directed edges) one slot at a time. In these cases, $S^e \bar{\varsigma}$ is a sequence of previously generated slot pairs, or more precisely, a sequence of embeddings corresponding to the previously generated slot pairs. For example, when generating a slot index $l_i$ at position i in the sequence, the slots in $S^e \bar{\varsigma}$ at positions 1, ..., i−1 are used as input to $f^e$. $S^e \bar{\varsigma}$ differs from the sequence $S \bar{\varsigma}$ in that $S^e \bar{\varsigma}$ lists embedding pairs of slot pairs that form directed edges, while $S \bar{\varsigma}$ lists the embeddings of all slots, where each slot occurs exactly once.

According to some aspects, the edge generation network includes a third position encoder. The third position encoder generates a positional encoding for an edge sequence, where the positional encoding includes the global token position sequence $S^{ei}$ and the tuple index of a token inside an edge $S^{et}=(0, 1, 2, 1, 2, \ldots, 0)$. The edge generation network then generates probabilities over slots indices as:

$$p_i^e = \text{Softmax}_j\left(\zeta j \cdot f^e\left(s_{<i}^{e\overline{S}}, s_{<i}^{ei}, s_{<i}^{et}\right)\right) \quad (8)$$

According to some aspects, in order to perform a semantic validity check for edge generation, the edges are constrained so that the edges always proceed from output slots to input slots, such that a first element of an edge tuple has to refer to an output slot and a second element of the edge tuple has to refer to an input slot. Furthermore, in some embodiments, the possible formation of cycles in the directed graph is mitigated by constraining end points of an edge to nodes that are not ancestors of a node at a start point of the edge.

At operation 620, the system combines the sequence of operator types, the sequence of operator parameters, and the sequence of directed edges to obtain a procedural media generator, where the procedural media generator includes a directed graph, and where each node of the directed graph includes an operator that includes an operator type from the sequence of operator types, a corresponding sequence of operator parameters, and one or more input connections and output connections from the sequence of directed edges that connects the node to another node of the directed graph. In some cases, the operations of this step refer to, or may be performed by, a graph component as described with reference to FIG. 2.

According to some aspects, the graph component receives the sequence of operator types $S^n$ from the node generation network, the sequence of operator parameters $S^p$ from the parameter generation network, and the sequence of directed edges $S^e$ from the edge generation network and combines the sequences by evaluating each of the sequences with each other in index order and translating the numerical information included in the sequences to visual information to obtain a procedural media generator including a directed graph. In some embodiments, the directed graph of the procedural media generator is a visual representation of nodes and directed edges, where a node is an image depicting characteristics corresponding to the operator type and the operator parameters associated with the node, and the directed edges are depicted as lines connecting input and output slots of the nodes in the directed graph according to the sequence of directed edges $S^e$. An example of a procedural media generator is described with reference to FIG. 8.

According to some aspects, the graph component evaluates a node graph (e.g., a directed graph) that defines a partial ordering among nodes in the node graph in any topological order. A node graph including cycles would cause infinite looping during evaluation, and cycles are constrained from being formed in the procedural media generator. Furthermore, in some embodiments, not all input slots of a node are connected to a directed edge. If no edge is attached to a node, the graph component uses a default value for the corresponding operator input (such as an image corresponding to all zero values). In some embodiments, a node that is a final media asset channel is marked by connecting one or more special output nodes to corresponding output slots of the node. The special output nodes do not perform an operation but instead annotate the directed graph.

According to some aspects, the graph component reconstructs operator parameters from a flattened operator parameter vector (e.g., sequence of operator parameters $S^p$). In an example, given an operator type $\tau_k$ and a corresponding flattened operator parameter sequence $S^{pk}$, the graph component is able to reconstruct the operator parameters, because a type and vector dimension of a parameter are fully defined by a node type and a parameter index of a node. In an example, the graph component reconstructs a variable length array of vectors from the flattened operator parameter vector by dividing a number of values generated for a parameter by the parameter's vector dimension. If the number is not evenly divisible, the graph component discards the last values to make the number divisible.

According to some aspects, the graph component identifies an input graph and combines the input graph with the directed graph to obtain the procedural media generator. For example, in some embodiments, a user inputs a directed graph to the procedural media generation apparatus. The machine learning model as described with reference to FIG. 2 is conditioned on the input graph by using a set of existing nodes and edges in the input graph as partial input sequences s<i. In some embodiments, the machine learning model provides one or more different completions of the input graph to the graph component, and the graph component outputs a combination of the input graph and the completion of the input graph as the procedural media generator. According to some aspects, the input graph is generated by the graph component based on a set of noise generators that are selected by the user.

The ability to complete an input graph offers a user of some embodiments of the present disclosure with functionality similar to an autocomplete function in a text editor, and provides the user with an ability to refine a partially complete directed graph using machine learning. In some embodiments, the procedural media generation apparatus displays one or more completed procedural media generators generated based on the input graph in a graphical user interface. In these cases, a user can select a preferred procedural media generator, or can select a subset of nodes included in a procedural media generator. If the user selects a subset of nodes, the procedural media generation apparatus can use the selected nodes as an input graph, and generate a subsequent procedural media generator based on the input graph. The user can repeatedly select nodes of subsequent procedural media generators to act as subsequent input graphs, thereby instructing the procedural media generation apparatus to obtain procedural media generators that include user-preferred characteristics. An example of this guided authoring process is provided with reference to FIG. 11.

At operation 625, the system generates a media asset using the procedural media generator. In some cases, the operations of this step refer to, or may be performed by, an asset generator as described with reference to FIG. 2. According to some aspects, the asset generator receives the procedural media generator as input and renders a media asset using the procedural media generator, such that the media asset is a visual depiction of the final characteristics determined by output nodes of the directed graph included in the procedural media generator. In some embodiments, the asset generator provides a graphical user interface (for example, via a display included in the procedural media generation apparatus or in a user device) that displays the procedural media generator and/or the media asset. Examples of media assets are described with reference to FIG. 8. An example of the graphical user interface is described with reference to FIG. 9.

Figure 7:
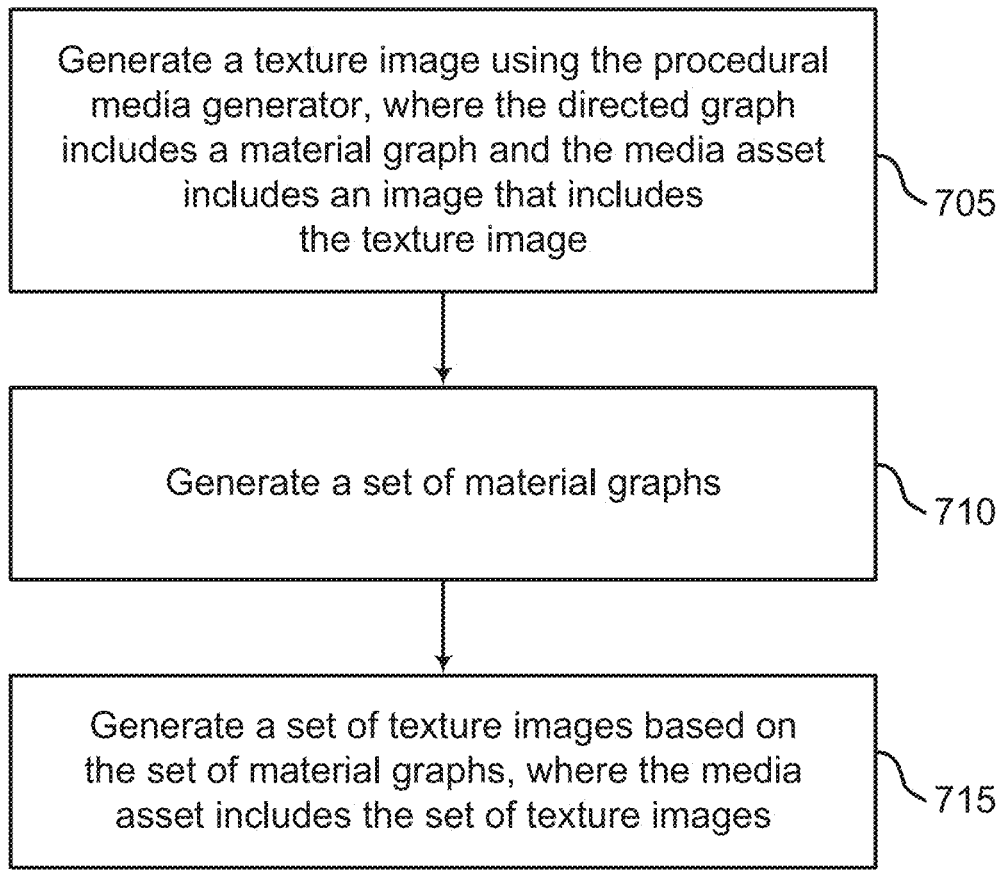
FIG. 7 shows an example of generating a plurality of texture images according to aspects of the present disclosure.

FIG. 7 shows an example of generating a plurality of texture images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, in some aspects, an asset generator described with reference to FIG. 2 includes an image rendering application. In these cases, the image rendering application generates a media asset including an image by rendering the image using the procedural media generator.

At operation 705, the system generates a texture image using the procedural media generator, where the directed graph includes a material graph and the media asset includes the texture image. In some cases, the operations of this step refer to, or may be performed by, an asset generator as described with reference to FIG. 2. For example, a material graph is a directed graph that describes "materials", or visual characteristics such as color, albedo, roughness, pattern, etc. that can be applied to at least a portion of a rendered texture image by the image rendering application.

At operation 710, the system generates a set of material graphs. In some cases, the operations of this step refer to, or may be performed by, a graph component as described with reference to FIG. 2. For example, in some embodiments, a user interaction with the graphical user interface prompts the machine learning model described with reference to FIG. 2 to generate values for a user-selected number of procedural media generators, each procedural media generator including a material graph, and the graph component generates the procedural media generators according to the corresponding generated values. In some cases, the user modifies operator parameter values of a procedural media generator as described with reference to FIG. 9, and the graph component outputs a modified procedural media generator corresponding to the modified operator parameter values.

At operation 715, the system generates a set of texture images based on the set of material graphs, where the media asset includes the set of texture images. In some cases, the operations of this step refer to, or may be performed by, an asset generator as described with reference to FIG. 2. According to some aspects, one material graph corresponds to one texture image, and a media asset refers to an asset that includes a set of texture images. In these cases, the texture images can be mapped to a model included in the media asset using the asset generator, such that the media asset includes the texture images. An example of a media asset including a set of texture images is described with reference to FIG. 8.

Figure 8:
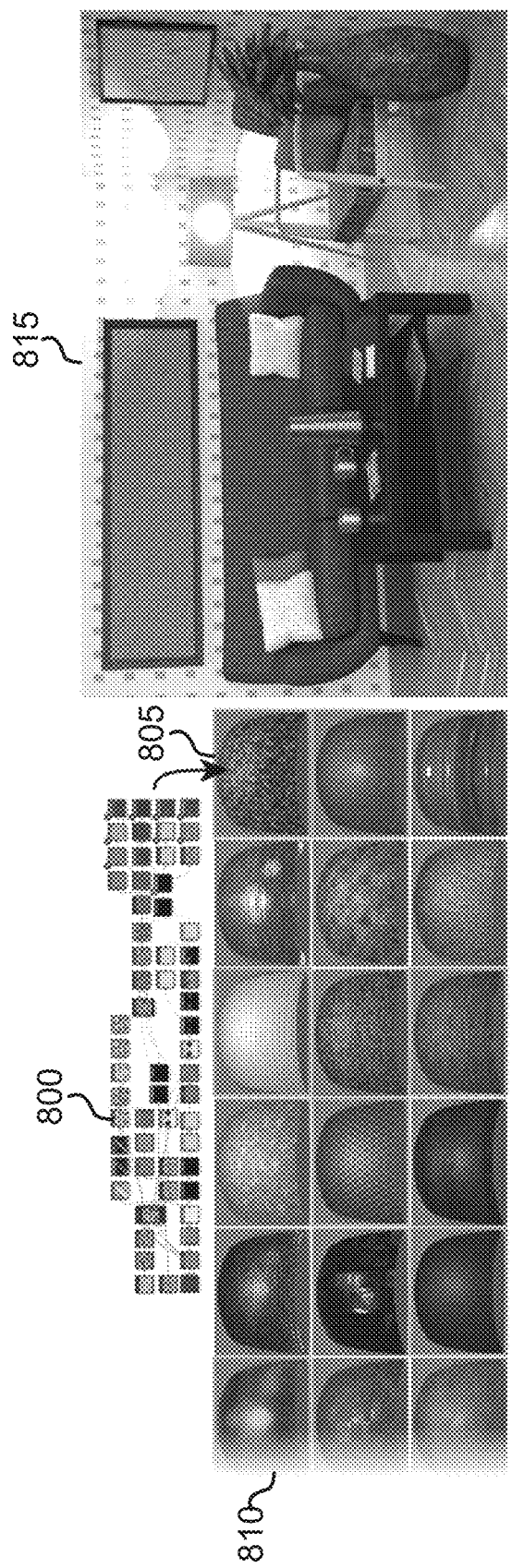
FIG. 8 shows an example of media assets according to aspects of the present disclosure.

FIG. 8 shows an example of media assets according to aspects of the present disclosure. The example shown includes procedural media generator 800, first media asset 805, plurality of texture images 810, and second media asset 815.

Referring to FIG. 8, procedural media generator 800 includes a directed graph that is a depiction of nodes and directed edges describing the relationships between the nodes. Each node of procedural media generator 800 is an image depicting characteristics determined by the node's operator type and operator parameters, and each directed edge is depicted as a line connecting two or more nodes. An asset generator described with reference to FIG. 2 receives procedural media generator 800 and outputs first asset 805 based on final characteristics described by output nodes in procedural media generator 800. In this case, first media asset 805 is a texture image that is included in plurality of texture images 810. Each texture image of plurality of texture images 810 corresponds to a different procedural media generator of a plurality of procedural media generators. Second media asset 815 includes plurality of texture images 810. In this case, the various characteristics numerically described by the plurality of procedural media generators and depicted by plurality of texture images 810 are applied to models included in second media asset 815.

Figure 9:
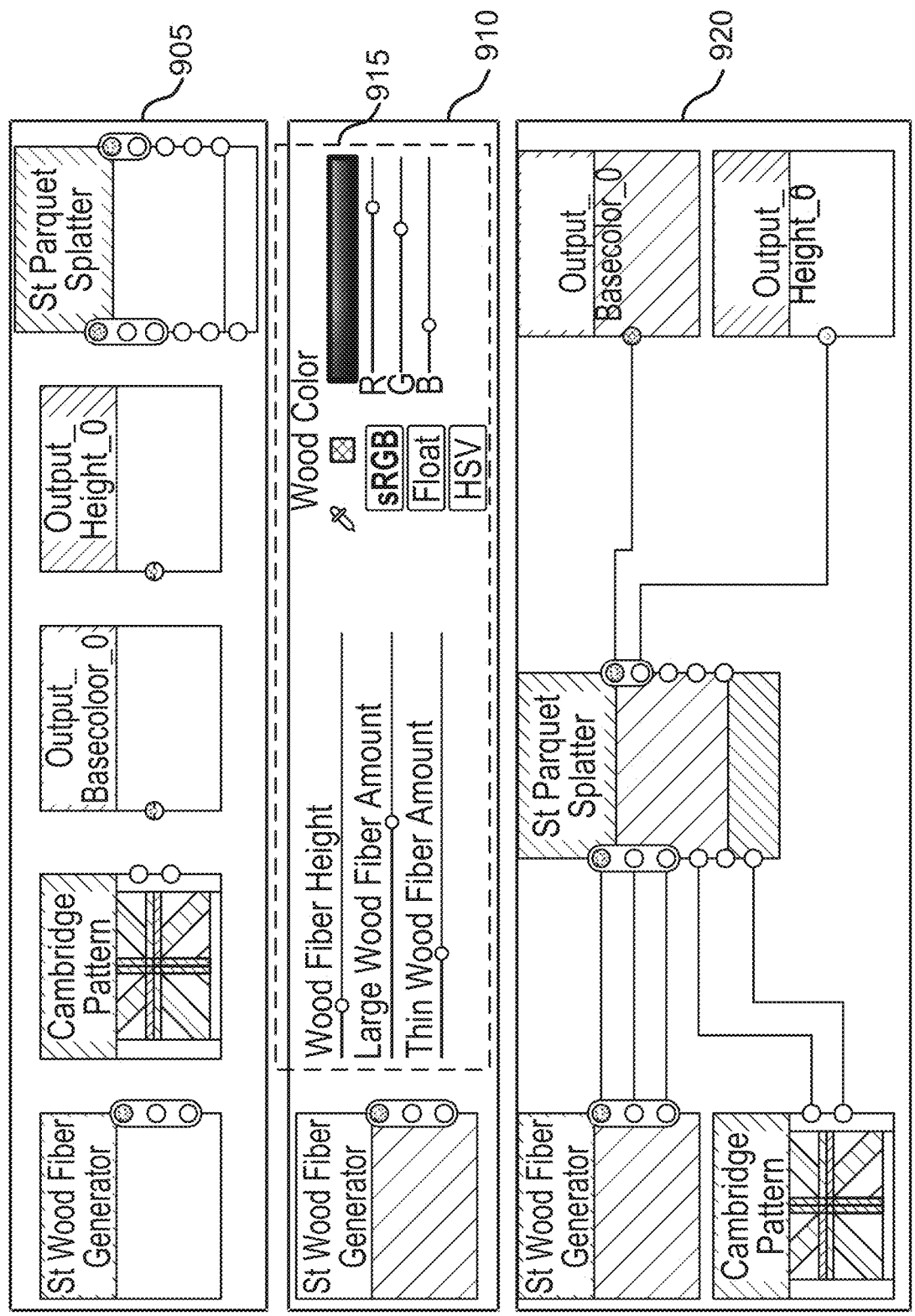
FIG. 9 shows an example of modifying operator parameters assets according to aspects of the present disclosure.

FIG. 9 shows an example of modifying operator parameters according to aspects of the present disclosure. The example shown includes operator type UI element 905, operator parameter UI element 910, operator parameter sliders 915, and edge UI element 920.

Referring to FIG. 9, in some embodiments, an asset generator as described with reference to FIG. 2 provides a graphical user interface that displays user interface (UI) elements associated with a procedural media generator that the asset generator has received as input. For example, the graphical user interface displays operator type UI element 905, operator parameter UI element 910, operator parameter sliders 915, and edge UI element 920. In some embodiments, each of the UI elements displayed in the graphical user interface includes textual descriptions of the corresponding values (such as "Cambridge Pattern", "Output Height", "Large Wood Fiber Amount", etc.) when the textual descriptions are available. In this case, operator type UI element 905 includes visual depictions of operator types included in some nodes of a procedural media generator, operator parameter UI element 910 includes a visual depiction of a selected node and operator parameter sliders 915 corresponding to operator parameters of the selected node, and edge UI element 920 includes a visual depiction of some nodes (including input and output slots) and directed edges of the procedural media generator.

Operator parameter sliders 915 allow a user to modify operator parameters of the procedural media generator. Because each node in the procedural media generator includes one or more operator parameters (e.g., numerical values describing characteristics of the node), the procedural media generator is parameterized, and is conveniently user-editable. For example, a user can select a node from a directed graph displayed in the graphical user interface to edit, and thereafter adjust operator parameters of the node using operator parameter sliders 915.

When the operator parameter sliders 915 are adjusted, the asset generator adjusts the procedural media generator to obtain an updated procedural media generator. After the asset generator adjusts the corresponding values, the asset generator generates a media asset that depicts the adjusted values using the updated procedural media generator.

Figure 10:
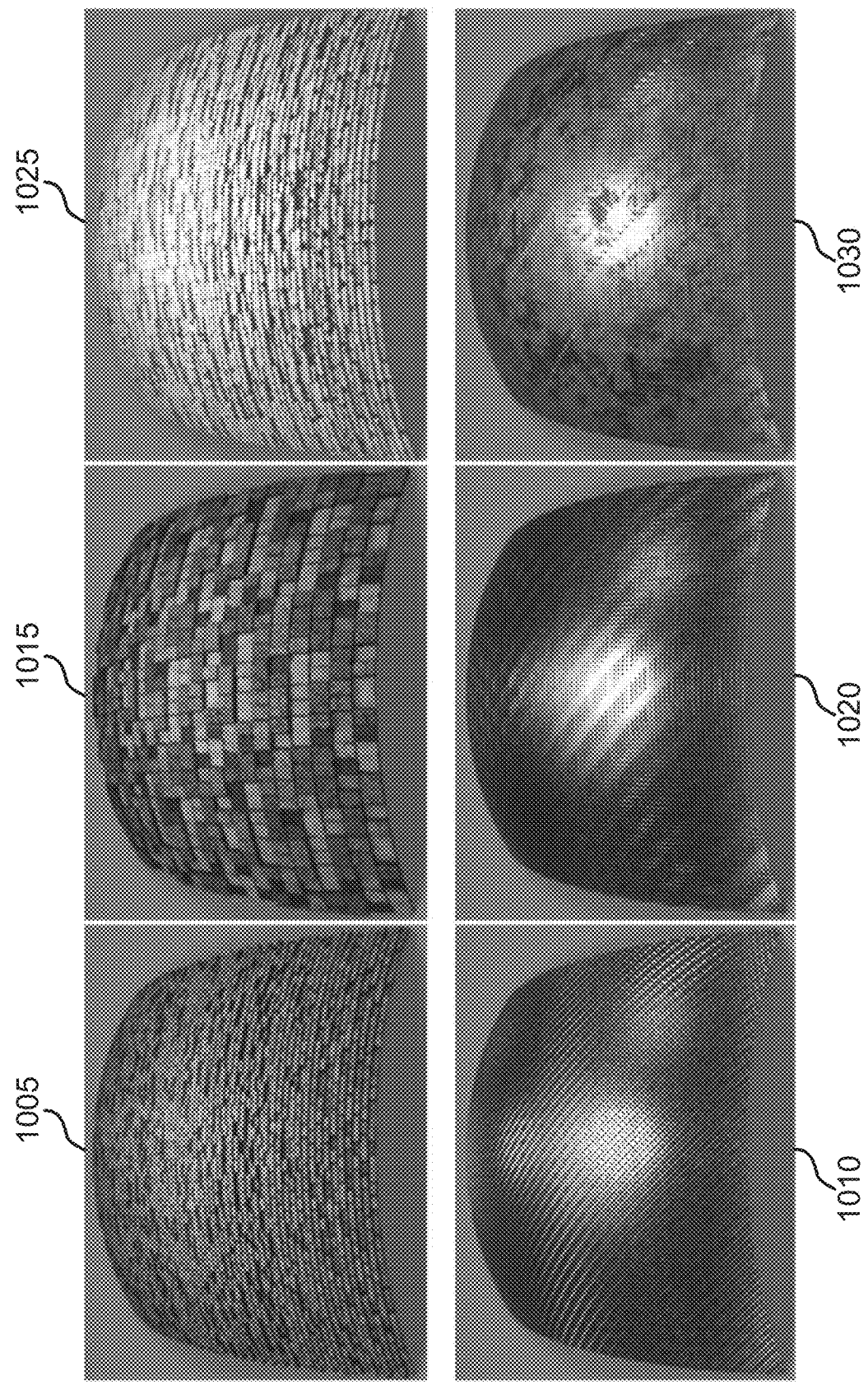
FIG. 10 shows an example of modified media assets according to aspects of the present disclosure.

FIG. 10 shows an example of modified media assets according to aspects of the present disclosure. The example shown includes first original media asset 1005, first modified media asset 1015, second modified media asset 1025, second original media asset 1010, third modified media asset 1020, and fourth modified media asset 1030.

Referring to FIG. 10, first original media asset 1005 is a media asset generated by an asset generator described with reference to FIG. 2 using a procedural media generator obtained as described with reference to FIG. 6. In this case, first original media asset 1005 includes a texture image. First modified media asset 1015 and second modified media asset 1025 are examples of media assets that are generated by the asset generator in response to user modification of operator parameters of the procedural media generator as described with reference to FIG. 9. Second original media asset 1010 is an example of a media asset generated using a second procedural media generator, and third modified media asset 1020 and fourth modified media asset 1030 are examples of media assets that are generated in response to user adjustments of operator parameters of the second procedural media generator.

As shown in FIG. 10, the user modifications to operator parameters associated with the first and second original media assets 1005 and 1010 add diverse changes to the materials depicted in the first through fourth modified media assets 1015, 1020, 1025, and 1030, such as weathering effects, color changes, or structure changes including different brick sizes. Because the procedural media generator is parameterized (e.g., includes operator parameters), a user can quickly generate a plurality of procedural media generators and a plurality of corresponding media assets by modifying the operator parameters.

Figure 11:
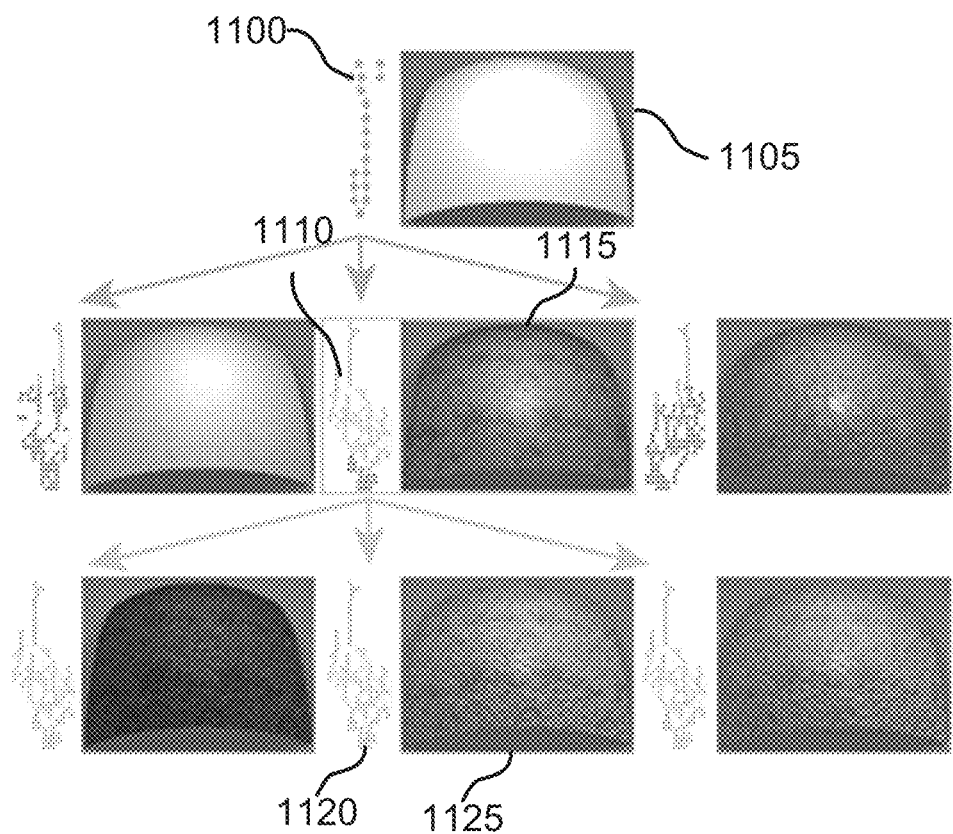
FIG. 11 shows an example of guided media asset authoring according to aspects of the present disclosure.

FIG. 11 shows an example of guided media asset authoring according to aspects of the present disclosure. The example shown includes input graph 1100, first texture image 1105, first procedural media generator 1110, second texture image 1115, second procedural media generator 1120, and third texture image 1125.

Referring to FIG. 11, input graph 1100 is a directed graph provided to the procedural media generation apparatus by a user. First texture image 1105 is a media asset generated by the asset generator in response to receiving input graph 1100. In this example, in addition to generating first texture image 1105, the procedural media generation apparatus obtains three procedural media generators (including first procedural media generator 1110) based on input graph 1100 and generates one or more media assets (including second texture image 1115) based on the procedural media generators, as described with reference to FIG. 6. In this case, medium-gray nodes in first procedural media generator 1110 are nodes that are inherited from input graph 1100.

In this example, the user selects a subset of nodes of first procedural media generator 1110 (indicated by a light gray color) to be retained in subsequent procedural media generators. In response to the selection, the procedural media generation apparatus obtains three subsequent procedural media generators (including second procedural media generator 1120) that include the user-retained nodes and re-generated versions of the remaining nodes. The degree of difference in appearances between texture images (including third texture image 1125) corresponding to the subsequent procedural media generators is determined by the number of nodes that are re-generated.

By performing autocompletion of an input graph, the guided media asset authoring approach provided by some embodiments of the present disclosure can help novice users to complete a project and allow more advanced users to explore a large variety of media asset spaces.

Figure 12:
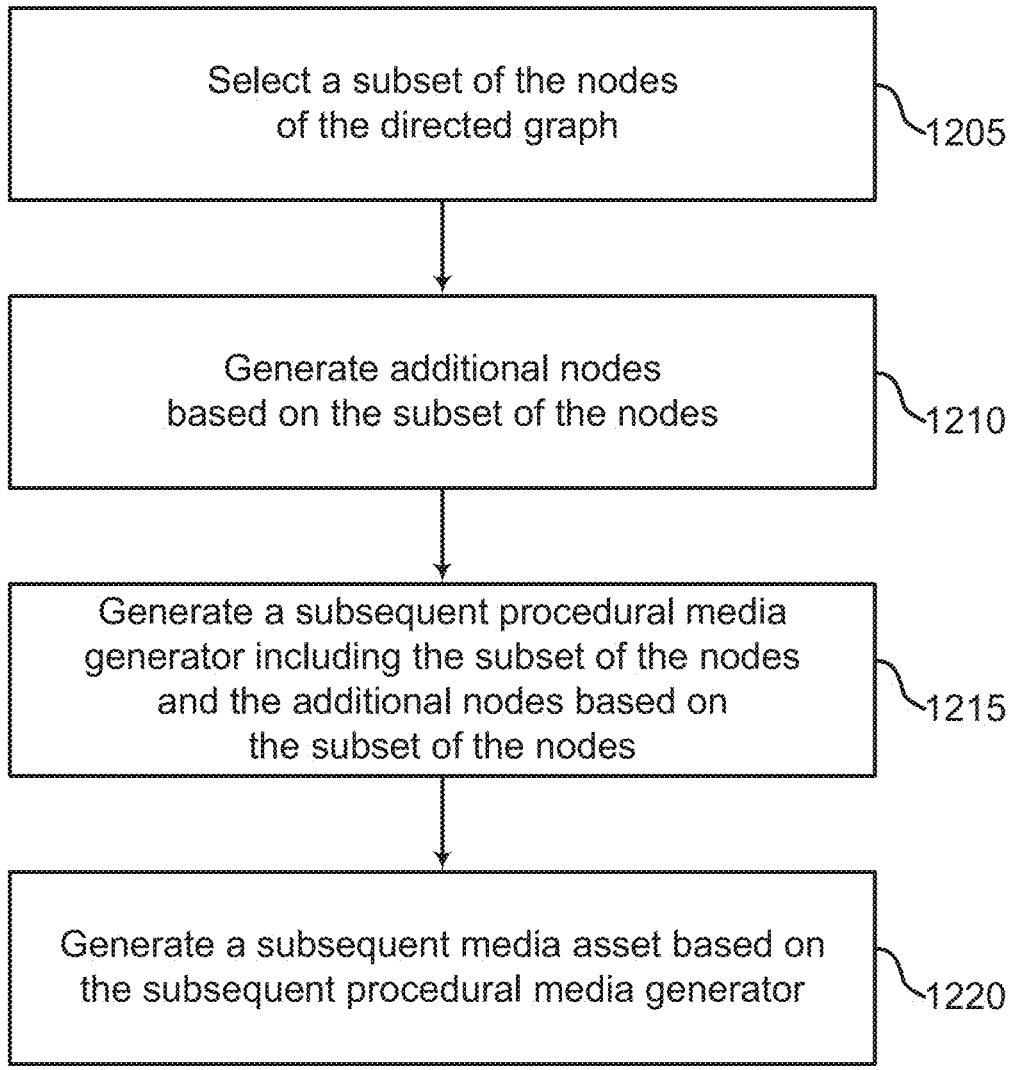
FIG. 12 shows an example of generating a subsequent media asset according to aspects of the present disclosure.

FIG. 12 shows an example of generating a subsequent media asset according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system selects a subset of nodes of the directed graph. In some cases, the operations of this step refer to, or may be performed by, a graph component as described with reference to FIG. 2. In an example, the directed graph is displayed in a graphical user interface, and the graph component selects the subset of nodes in the directed graph in response to a user input to the graphical user interface.

At operation 1210, the system generates additional nodes based on the subset of the nodes. In some cases, the operations of this step refer to, or may be performed by, a machine learning model as described with reference to FIG. 2. For example, the machine learning model generates the additional nodes using the process of operator type generation and operator parameter generation as described with reference to FIG. 6. In some embodiments, the operator parameters of the additional nodes are variations on operator parameters included in the subset of nodes. In some embodiments, the machine learning model generates additional directed edges, where the additional directed edges are generated using the process of generating directed edges described with reference to FIG. 6.

At operation 1215, the system generates a subsequent procedural media generator including the subset of the nodes and the additional nodes based on the subset of the nodes. In some cases, the operations of this step refer to, or may be performed by, a graph component as described with reference to FIG. 2. For example, the graph component combines the subset of nodes, the additional nodes, and the additional directed edges connecting the additional nodes to obtain the subsequent procedural media generator.

At operation 1220, the system generates a subsequent media asset based on the subsequent procedural media generator. In some cases, the operations of this step refer to, or may be performed by, an asset generator as described with reference to FIG. 2. For example, the asset generator outputs a media asset based on output nodes of the subsequent media generator as described with reference to FIG. 6.

Training

A method for procedural media generation is described with reference to FIGS. 13-15. One or more aspects of the method include identifying training data including a ground truth procedural media generator; identifying a subset of operators from the ground truth procedural media generator; predicting a next operator type using a node generation network based on the subset of operators; computing an operator type loss based on the predicted next operator type and a next operator type of the ground truth procedural media generator; and updating parameters of the node generation network based on the operator type loss.

Some examples of the method further include identifying a topological node ordering for the ground truth procedural media generator. Some examples further include comparing the predicted next operator type and the next operator type of the ground truth procedural media generator based on the topological node ordering, wherein the operator type loss is based on the comparison. In some aspects, the topological node ordering comprises a back-to-front breadth-first traversal of the ground truth procedural media generator.

Some examples of the method further include predicting a sequence of operator parameters for an operator type based on the subset of operators using a parameter generation network. Some examples further include computing a parameter loss based on the predicted sequence of operator parameters and a sequence of operator parameters from the ground truth procedural media generator. Some examples further include updating parameters of the parameter generation network based on the parameter loss.

Some examples of the method further include predicting one or more directed edges based on the subset of operators using an edge generation network. Some examples further include computing a directed edge loss based on the predicted directed edge and a sequence of directed edges from the ground truth procedural media generator. Some examples further include updating parameters of the edge generation network based on the directed edge loss.

Figure 13:
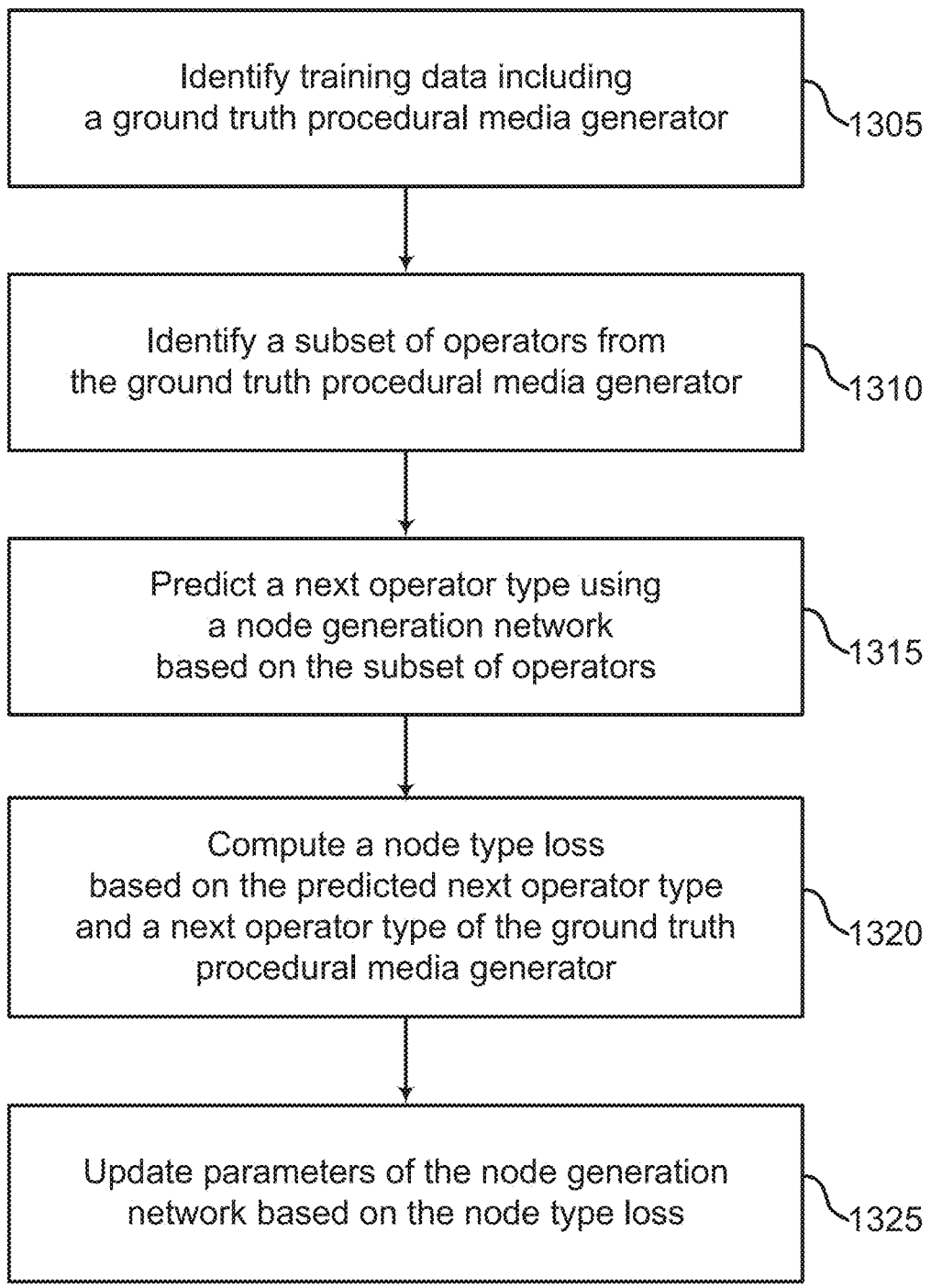
FIG. 13 shows an example of training a machine learning model according to aspects of the present disclosure.

FIG. 13 shows an example of training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 13, a training component updates parameters of the node generation network based on a comparison of the node generation network's prediction of a next value in a token sequence with the actual value included in a ground truth procedural media generator.

At operation 1305, the system identifies training data including a ground truth procedural media generator. In some cases, the operations of this step refer to, or may be performed by, a training component as described with reference to FIG. 2. In an example, the training component retrieves the training data from a database, such as the database described with reference to FIG. 1. In some cases, a user provides the training data to the training component. According to some aspects, the ground truth procedural media generator includes a set of operator types, sets of operator parameters corresponding to the operator types, and a set of directed edges corresponding to the operator types and the operator parameters.

At operation 1310, the system identifies a subset of operators from the ground truth procedural media generator. In some cases, the operations of this step refer to, or may be performed by, a training component as described with reference to FIG. 2. In an example, an operator (e.g., a node) includes an operator type and a set of operator parameters corresponding to the operator type. In some embodiments, the training component samples the subset of operators of the ground truth procedural media generator to provide to the node generation network.

At operation 1315, the system predicts a next operator type using a node generation network based on the subset of operators. In some cases, the operations of this step refer to, or may be performed by, a node generation network as described with reference to FIG. 2. For example, the node generation network predicts a next operator type in the sequence of operator types $S^n$ as described with reference to FIG. 6.

At operation 1320, the system computes an operator type loss based on the predicted next operator type and a next operator type of the ground truth procedural media generator. In some cases, the operations of this step refer to, or may be performed by, a training component as described with reference to FIG. 2.

According to some aspects, the training component identifies a topological node ordering for the ground truth procedural media generator and compares the predicted next operator type and the next operator type of the ground truth procedural media generator based on the topological node ordering, where the operator type loss is based on the comparison. In some cases, the topological node ordering comprises a back-to-front breadth-first traversal of the ground truth procedural media generator. According to some embodiments, the training component obtains the operator type loss using a binary cross-entropy loss function over the probabilities estimated by the first sequence generator described with reference to FIG. 2. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data (e.g., the loss).

At operation 1325, the system updates parameters of the node generation network based on the operator type loss. In some cases, the operations of this step refer to, or may be performed by, a training component as described with reference to FIG. 2. For example, after computing the operator type loss, the training component updates the parameters of the node generation network based on the loss, and a new set of predictions are made by the node generation network during the next iteration. According to some aspects, the training component uses teacher forcing at training time, such that ground truth tokens are used for the partial sequences $s_{<i}$.

Figure 14:
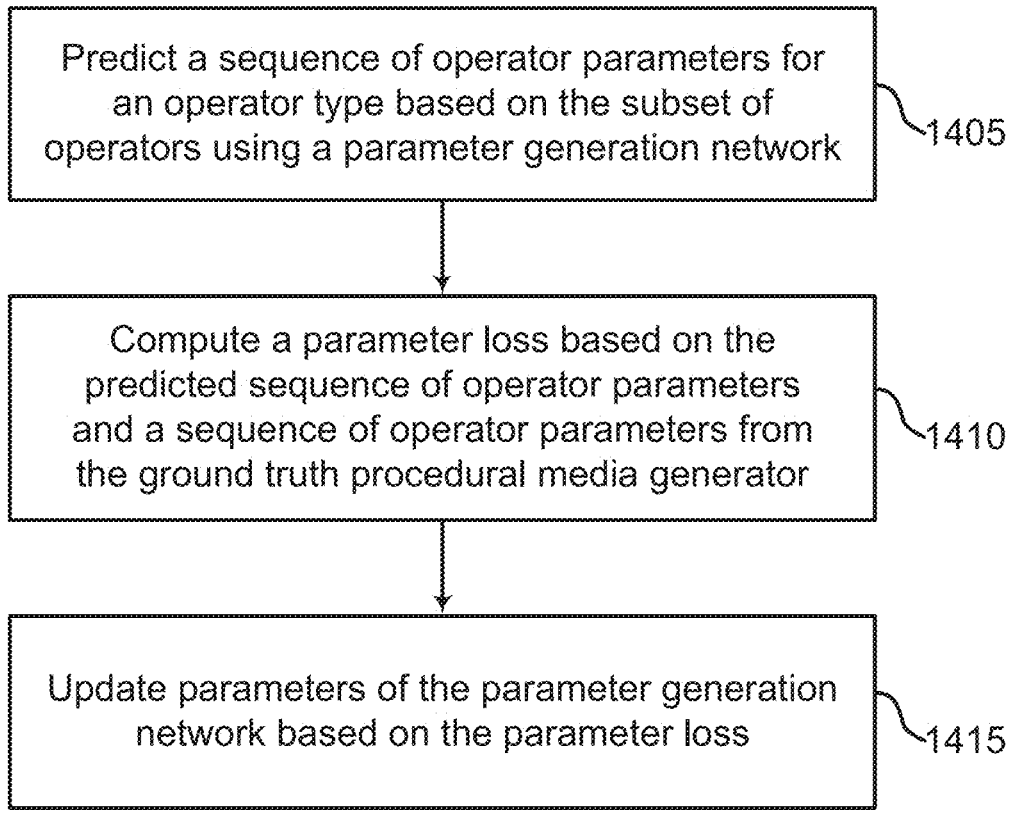
FIG. 14 shows an example of training a machine learning model based on a parameter loss according to aspects of the present disclosure.

FIG. 14 shows an example of training a machine learning model based on a parameter loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system predicts a sequence of operator parameters for an operator type based on the subset of operators using a parameter generation network. In some cases, the operations of this step refer to, or may be performed by, a parameter generation network as described with reference to FIGS. 2 and 3. For example, the training component identifies operator parameters included in the subset of operators described with reference to FIG. 13 and provides the identified operator parameters to the parameter generation network. The parameter generation network receives the identified operator parameters and predicts, as described with reference to FIG. 6, subsequent values in a sequence of operator parameters $S^p$ in which the identified operator parameters are the initial values.

At operation 1410, the system computes a parameter loss based on the predicted sequence of operator parameters and a sequence of operator parameters from the ground truth procedural media generator. In some cases, the operations of this step refer to, or may be performed by, a training component as described with reference to FIG. 2. According to some aspects, the training component receives the predicted sequence of operator parameters $S^p$ and computes the parameter loss by comparing the predicted sequence of operator parameters $S^p$ to the ground truth sequence of operator parameters $S^p$ using a binary cross-entropy loss function.

At operation 1415, the system updates parameters of the parameter generation network based on the parameter loss. In some cases, the operations of this step refer to, or may be performed by, a training component as described with reference to FIG. 2. According to some aspects, the training component uses teacher forcing at training time, such that ground truth tokens are used for the partial sequences $s_{<i}$, and each processing step of the parameter generation network is trained separately using ground truth nodes as input for the parameter generation network. According to some aspects, training is stopped once a minimum of the parameter loss is reached to avoid overfitting. In some embodiments, the first sequence encoder is jointly trained jointly with the second transformer network.

Figure 15:
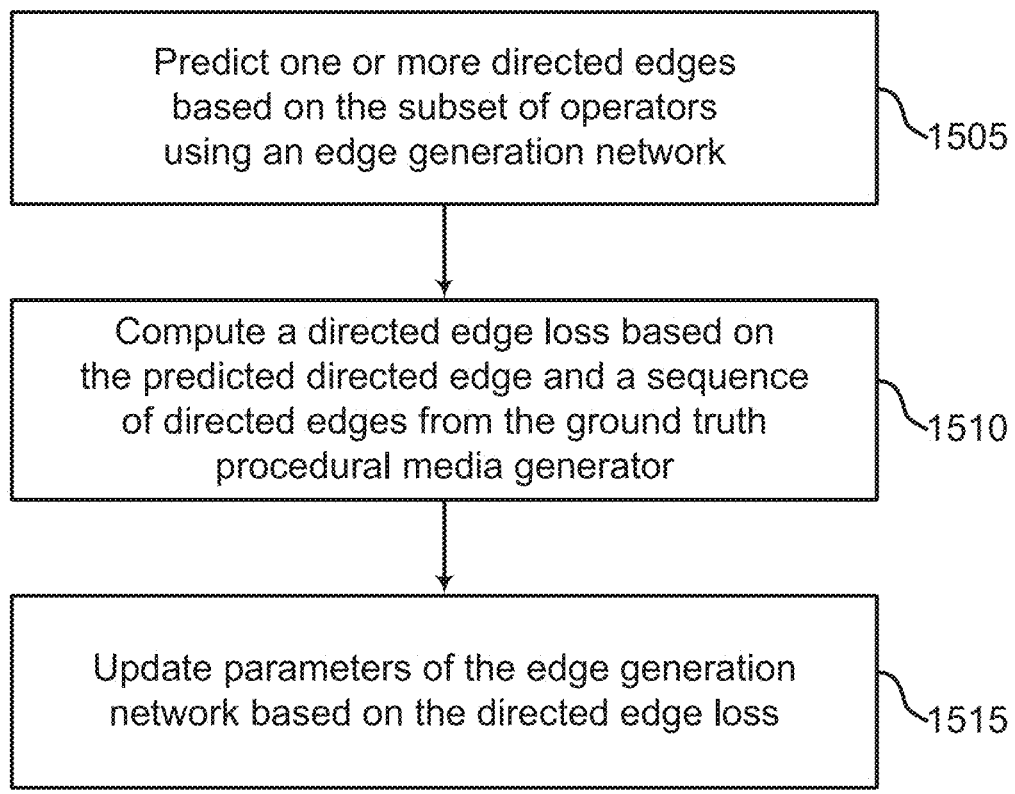
FIG. 15 shows an example of training a machine learning model based on a directed edge loss according to aspects of the present disclosure.

FIG. 15 shows an example of training a machine learning model based on a directed edge loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system predicts one or more directed edges based on the subset of operators using an edge generation network. In some cases, the operations of this step refer to, or may be performed by, an edge generation network as described with reference to FIGS. 2 and 4. For example, the training component identifies directed edges connected to the subset of operators described with reference to FIG. 13 and provides the identified directed edges to the parameter generation network. The parameter generation network receives the identified directed edges and predicts, as described with reference to FIG. 6, subsequent values in a sequence of directed edges $S^e$ in which the identified directed edges are the initial values.

At operation 1510, the system computes a directed edge loss based on the predicted directed edge and a sequence of directed edges from the ground truth procedural media generator. In some cases, the operations of this step refer to, or may be performed by, a training component as described with reference to FIG. 2. According to some aspects, the training component receives the predicted sequence of directed edges $S^e$ and computes the directed edge loss by comparing the predicted sequence of directed edges $S^e$ to the ground truth sequence of operator parameters $S^e$ using a binary cross-entropy loss function.

At operation 1515, the system updates parameters of the edge generation network based on the directed edge loss. In some cases, the operations of this step refer to, or may be performed by, a training component as described with reference to FIG. 2. According to some aspects, the training component uses teacher forcing at training time, such that ground truth tokens are used for the partial sequences $s_{<i}$, and each processing step of the edge generation network is trained separately using ground truth nodes as input for the edge generation network. According to some aspects, training is stopped once a minimum of the edge generation loss is reached to avoid overfitting. In some embodiments, the second sequence encoder is jointly trained jointly with the pointer network.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for procedural media generation comprising:
generating, by a node generation network, a sequence of operator types;
generating, by a parameter generation network, a sequence of operator parameters for each operator type of the sequence of operator types;

generating, by an edge detection network, a sequence of directed edges based on the sequence of operator types;
combining, by a graph component, the sequence of operator types, the sequence of operator parameters, and the sequence of directed edges to obtain a procedural media generator, wherein the procedural media generator comprises a directed graph, and wherein each node of the directed graph comprises an operator that includes an operator type from the sequence of operator types, a corresponding sequence of operator parameters, and an input connection or an output connection from the sequence of directed edges that connects the node to another node of the directed graph; and
generating, by an asset generator, a media asset using the procedural media generator.

2. The method of claim 1, further comprising:
generating, by the node generation network, a sequence of node depth values for the sequence of operator types, wherein each operator type in the sequence of operator types is generated based on a set of previous operator types and a set of previous node depth values.

3. The method of claim 1, further comprising:
generating, by the node generation network, a sequence of global position values for the sequence of operator types, wherein each operator type in the sequence of operator types is generated based on a set of previous operator types and a set of previous global position values.

4. The method of claim 1, wherein:
each value in the sequence of operator parameters corresponds to a different parameter type.

5. The method of claim 1, further comprising:
identifying, by the graph component, a plurality of slots corresponding to input slots and output slots of the sequence of operator types;
computing, by the graph component, a slot embedding for each of the plurality of slots; and
generating, by the graph component, a sequence of slot indices based on the slot embeddings, wherein each pair of consecutive indices corresponds to a directed edge in the sequence of directed edges.

6. The method of claim 1, further comprising:
identifying, by the graph component, an input graph; and
combining, by the graph component, the input graph with the directed graph to obtain the procedural media generator.

7. The method of claim 1, further comprising:
selecting, by the graph component, a subset of nodes of the directed graph;
generating, by a machine learning model, additional nodes based on the subset of the nodes;
generating, by the graph component, a subsequent procedural media generator including the subset of the nodes and the additional nodes based on the subset of the nodes;
generating, by the asset generator, a subsequent media asset based on the subsequent procedural media generator.

8. The method of claim 1, further comprising:
generating, by the asset generator, a texture image using the procedural media generator, wherein the directed graph comprises a material graph and the media asset comprises an image that includes the texture image.

9. The method of claim 8, further comprising:
generating, by the graph component, a plurality of material graphs;

generating, by the asset generator, a plurality of texture images based on the plurality of material graphs, wherein the media asset includes the plurality of texture images.

10. The method of claim 1, further comprising:
generating, by the asset generator, a geometry model using the procedural media generator, wherein the media asset comprises an image that depicts a shape based on the geometry model.

11. A method for procedural media generation comprising:
identifying, by a training component, training data including a ground truth procedural media generator;
identifying, by the training component, a subset of operators from the ground truth procedural media generator;
predicting, by a node generation network, a next operator type based on the subset of operators;
computing, by the training component, an operator type loss based on the predicted next operator type and a next operator type of the ground truth procedural media generator; and
updating, by the training component, parameters of the node generation network based on the operator type loss.

12. The method of claim 11, further comprising:
identifying a topological node ordering for the ground truth procedural media generator;
comparing the predicted next operator type and the next operator type of the ground truth procedural media generator based on the topological node ordering, wherein the operator type loss is based on the comparison.

13. The method of claim 12, wherein:
the topological node ordering comprises a back-to-front breadth-first traversal of the ground truth procedural media generator.

14. The method of claim 11, further comprising:
predicting, by a parameter generation network, a sequence of operator parameters for an operator type based on the subset of operators;
computing, by the training component, a parameter loss based on the predicted sequence of operator parameters and a sequence of operator parameters from the ground truth procedural media generator; and
updating, by the training component, parameters of the parameter generation network based on the parameter loss.

15. The method of claim 11, further comprising:
predicting, by an edge generation network, one or more directed edges based on the subset of operators;
computing, by the training component, a directed edge loss based on the predicted directed edge and a sequence of directed edges from the ground truth procedural media generator; and
updating, by the training component, parameters of the edge generation network based on the directed edge loss.

16. An apparatus for procedural media generation comprising:
a node generation network configured to generate a sequence of operator types;
a parameter generation network configured to generate a sequence of operator parameters for each operator type of the sequence of operator types;
an edge generation network configured to generate a sequence of directed edges based on the sequence of operator types;

a graph component configured to combine the sequence of operator types, the sequence of operator parameters, and the sequence of directed edges to obtain a procedural media generator, wherein the procedural media generator comprises a directed graph, and wherein each node of the directed graph comprises an operator that includes an operator type from the sequence of operator types, a corresponding sequence of operator parameters, and an input connection or an output connection from the sequence of directed edges that connects the node to another node of the directed graph; and an asset generator configured to generate a media asset using the procedural media generator.

17. The apparatus of claim 16, wherein:
the node generation network comprises a first transformer network;
the parameter generation network comprises a second transformer network; and
the edge generation network comprises a pointer network.

18. The apparatus of claim 17, wherein:
the edge generation network includes a position encoder.

19. The apparatus of claim 16, wherein:
the asset generator comprises an image rendering application.

20. The apparatus of claim 16, further comprising:
a training component configured to update parameters each of the node generation network, the parameter generation network, and the edge generation network.

* * * * *